United States Patent
Filippov et al.

(10) Patent No.: US 12,101,467 B2
(45) Date of Patent: Sep. 24, 2024

(54) METHOD AND APPARATUS OF COMBINED INTRA-INTER PREDICTION USING MATRIX-BASED INTRA PREDICTION

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 17/703,661

(22) Filed: Mar. 24, 2022

(65) Prior Publication Data
US 2022/0256141 A1 Aug. 11, 2022

Related U.S. Application Data

(63) Continuation of application No. PCT/RU2020/050234, filed on Sep. 21, 2020.

(Continued)

(51) Int. Cl.
*H04N 19/105* (2014.01)
*H04N 19/136* (2014.01)
(Continued)

(52) U.S. Cl.
CPC ......... *H04N 19/105* (2014.11); *H04N 19/136* (2014.11); *H04N 19/159* (2014.11); *H04N 19/176* (2014.11)

(58) Field of Classification Search
CPC .. H04N 19/105; H04N 19/136; H04N 19/159; H04N 19/176
See application file for complete search history.

(56) References Cited

U.S. PATENT DOCUMENTS

| 9,609,343 B1 | 3/2017 | Chen et al. |
| 2015/0117527 A1 | 4/2015 | Gamei et al. |

(Continued)

FOREIGN PATENT DOCUMENTS

| CN | 108781283 A | 11/2018 |
| WO | 2017082670 A1 | 5/2017 |

OTHER PUBLICATIONS

Huo et al., Non-CE3: Removal of MIP mapping table; JVET-O0321-v3; Jul. 3-12, 2019 (Year: 2019).*

(Continued)

*Primary Examiner* — Jonathan R Messmore
(74) *Attorney, Agent, or Firm* — Leydig, Voit & Mayer, Ltd.

(57) ABSTRACT

A method performs combined inter-intra prediction of a current block in video coding. The combined intra-inter-prediction is used for providing a prediction block, and the weights for the intra- and inter-prediction blocks used to obtain the prediction block can be finely tuned The method includes: determining prediction information for a neighboring block adjacent to the current block, the prediction information comprising a prediction mode used for prediction of the neighboring block, determining whether matrix-based intra prediction (MIP) is to be used for the prediction of the current block; and predicting the current block as a weighted sum of an intra-predicted block and an inter-predicted block. The weights of the inter-predicted block and the intra-predicted block are determined based on the prediction information for the neighboring block and the determining whether MIP is to be used for the prediction of the current block.

19 Claims, 21 Drawing Sheets

Related U.S. Application Data

(60) Provisional application No. 62/905,359, filed on Sep. 24, 2019.

(51) Int. Cl.
  *H04N 19/159* (2014.01)
  *H04N 19/176* (2014.01)

(56) References Cited

U.S. PATENT DOCUMENTS

| | | | |
|---|---|---|---|
| 2018/0288410 A1 | 10/2018 | Park et al. | |
| 2018/0376149 A1 | 12/2018 | Zhang et al. | |
| 2021/0274214 A1* | 9/2021 | Moon | H04N 19/46 |
| 2022/0038691 A1* | 2/2022 | Li | H04N 19/176 |

OTHER PUBLICATIONS

Chen et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11, 15th Meeting: Gothenburg, SE, JVET-O2002-v1, Total 82 pages, International Union of Telecommunication, Geneva, Switzerland (Jul. 3-12, 2019).

Bross et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, JVET-O2001-v7, Total 411 pages, International Union of Telecommunication, Geneva, Switzerland (Jul. 3-12, 2019).

Zhu, "A combined intra-inter prediction for depth video coding," School of Electronic Information Engineering, Tianjin University, Tianjin, China, Total 4 pages (Oct. 25, 2016). With an English abstract.

Pfaff et al., "CE3: Affine linear weighted intra prediction (CE3-4.1, CE3-4.2)," Joint Video Experts Team (JVET) of ITU-T SG 16 WP 3 and ISO/IEC JTC 1/SC 29/WG11, 14th Meeting: Geneva, CH, Document: JVET-N0217, Total 17 bages, International Union of Telecommunication, Geneva, Switzerland (Mar. 19-27, 2019).

Zhang et al., "Intra-prediction Mode Propagation for Inter-pictures," Joint Video Experts Team (JVET) of ITU-T SG 16 WP 3 and ISO/IEC JTC 1/SC 29/WG 11, 10th Meeting: San Diego, US, Document: JVET-J0053, Total 4 pages (Apr. 10-20, 2018).

Chiang et al., "CE10.1.1: Multi-hypothesis prediction for improving AMVP mode, skip or merge mode, and intra mode," Joint Video Experts Team (JVET) of ITU-T SG 16 WP 3 and ISO/IEC JTC 1/SC 29/WG 11, 12th Meeting: Macao, CN, Document: JVET-L0100-v3, Total 14 pages (Oct. 3-12, 2018).

Van et al., "CE10-related: Inter-intra prediction combination," Joint Video Experts Team (JVET) of ITU-T SG 16 WP 3 and ISO/IEC JTC 1/SC 29/WG 11, 13th Meeting: Marrakech, MA, Document: JVET-M0096-v3, Total 4 pages (Jan. 9-18, 2019).

"Series H: Audiovisual and Multimedia Systems, Infrastructure of audiovisual services—Coding of moving video, Advanced video coding for generic audiovisual services," Recommendation ITU-T H.264, ITU-T Telecommunication Standardization Sector of ITU, Total 836 pages, International Telecommunication Union, Geneva, Switzerland (Jun. 2019).

"Series H: Audiovisual and Multimedia Systems, Infrastructure of audiovisual services—Coding of moving video, High efficiency video coding," Recommendation Itu-T H.265, ITU-T Telecommunication Standardization Sector of ITU, Total 696 pages, International Telecommunication Union, Geneva, Switzerland (Jun. 2019).

Bross et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, JVET-O2001-v7, Total 435 pages, International Union of Telecommunication, Geneva, Switzerland (Jul. 3-12, 2019).

* cited by examiner

METHOD AND APPARATUS OF COMBINED INTRA-INTER PREDICTION USING MATRIX-BASED INTRA PREDICTION

CROSS-REFERENCE TO RELATED APPLICATIONS

This application is a continuation of International Application No. PCT/RU2020/050234, filed on Sep. 21, 2020, which claims priority to U.S. Provisional Patent Application No. 62/905,359, filed on Sep. 24, 2019. The disclosures of the aforementioned applications are hereby incorporated by reference in their entireties.

FIELD

Embodiments of the present application (disclosure) generally relate to the field of picture processing and more particularly to combined intra-inter prediction.

BACKGROUND

Video coding (video encoding and decoding) is used in a wide range of digital video applications, for example broadcast digital television (TV), video transmission over internet and mobile networks, real-time conversational applications such as video chat, video conferencing, digital video disc (DVD) and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

In particular, video coding may be based on intra-prediction and/or inter-prediction. More particularly, combined inter-intra prediction can be applied wherein a current block is predicted by a prediction block obtained as a weighed sum of an inter-prediction block and an intra-prediction block. However, adjusting the weights of the weighted sum is very restricted in the art and, consequently accuracy of the resulting prediction blocks may be not satisfying in particular applications. Therefore, it is desirable that the accuracy of prediction blocks obtained by combined inter-intra prediction is increased.

SUMMARY

According to embodiments of the present application apparatuses and methods for coding (i.e., encoding or decoding, respectively) according to the independent claims are provided.

It is provided a method for combined inter-intra prediction of a current block in video coding, comprising: determining prediction information for a neighboring block adjacent to said current block, the prediction information comprising a prediction mode used for prediction of the neighboring block; determining whether matrix-based intra prediction, (MIP), is to be used for the prediction of the current block; and predicting the current block as a weighted sum of an intra-predicted block and an inter-predicted block, wherein weights of the inter-predicted block and the intra-predicted block are determined based on the prediction information for the neighboring block and the determining whether MIP is to be used for the prediction of the current block.

Accordingly, the weights used for the generation of the prediction block can be adapted to the prediction information, for example, comprising information on a prediction mode used for the neighboring block, obtained for the neighboring block and the condition whether or not MIP is to be used. The weights, thus, can be finely tuned with a high flexibility depending on the prediction modes employed. For example, whether the neighboring block has been predicted applying a combined inter-intra prediction (CIIP) mode may be determined and used for a finer determination of the weights of the intra- and inter-predicted blocks. Specifically, a neighboring block may be predicted using a CIIP mode. Thus, the determining of the prediction information may comprise determining that the prediction mode used for prediction of the neighboring block is a combined inter-intra-prediction, CIIP, mode. Further, the prediction information may comprise an inter-prediction mode and an intra-prediction mode. By considering additional properties of the neighboring blocks as compared to the art, more appropriate values of intra- and inter-weights may be selected in the CIIP of the current block thereby achieving more accurate prediction blocks. For example, the weight for the intra-predicted block may be determined to be higher than the one for the inter-predicted block when it is determined that MIP is to be used for the prediction of the current block. For example, the weight for the intra-predicted block may be higher than the one for the inter-predicted block when CIIP is used for the neighboring block or when MIP is used for predicting the neighboring block.

In particular, by associating different weights of the inter-predicted block and the intra-predicted block depending on whether the prediction mode of a neighboring block is an inter-prediction mode, a CIIP mode or an intra-prediction mode, a finer determination of the weights may be achieved. In other words, the weights of the inter-predicted block and the intra-predicted block are determined under consideration of the prediction mode applied to the neighboring blocks, wherein the more accurate differentiation between different prediction modes (inter-, CIIP and intra-prediction) as compared to the art results in a finer determination of weights for the prediction of the current block.

According to an aspect, the method further comprises determining additional prediction information for n additional neighboring blocks adjacent to said current block, the additional prediction information comprising prediction modes used for prediction of the n additional neighboring block, n being an integer between 1 and the number of all neighboring blocks adjacent to said current block minus 1. In this case, the weights of the inter-predicted block and the intra-predicted block are also determined based on the additional prediction information. Thereby, an even finer determination of the weights of the intra- and inter-predicted blocks resulting in an even more accurate prediction block may be achieved.

According to a further aspect, the intra-predicted block is predicted by a predefined intra-prediction mode and/or by a selected intra-prediction mode. Similarly, the inter-predicted block may be predicted by a predefined inter-prediction mode and/or by a selected inter-prediction mode. Thus, the method may, particularly, make use of one kind of an intra-prediction mode and/or inter-prediction mode in order to reduce the overall complexity and signaling load of the CIIP of the current block or, in order to increase flexibility and possibly accuracy of the CIIP, the actually applied intra-prediction and/or inter-prediction mode may be selected for a variety of modes that are offered, in principle.

In particular, the inter-predicted block may be predicted by at least one of a merge mode, motion estimation, and Frame-Rate Up-Conversion in order to possibly arrive at accurate prediction results.

As already mentioned the weights according to the method for combined inter-intra prediction of a current block in video coding can be finely tuned in order to obtain accurate prediction blocks. According to a particular aspect, the weights of the inter-predicted block and the intra-predicted block depend on at least one of the number of inter-predicted neighboring blocks adjacent to said current block, the number of intra-predicted neighboring blocks adjacent to said current block and the number of CIIP predicted neighboring blocks adjacent to said current block. Taking into according the various numbers of neighboring blocks may help to properly finely tune the weights used for the CIIP of the current block.

For example, the higher the number of intra-predicted neighboring blocks adjacent to said current block is, the higher the weight of the intra-predicted block used in the CIIP of the current block may be chosen in order to possibly arrive at very accurate prediction results.

According to another example, the weight of the inter-predicted block used in the CIIP of the current block is determined complementarily to the determined weight of the intra-predicted block. Thereby, the individual contributions of the inter-predicted block and the intra-predicted block used in the CIIP of the current block can be finely tuned.

As already indicated, the weights for the inter-predicted block and the intra-predicted block used in the CIIP of the current block are not only determined based on the properties of one or more neighboring block but also depend on the determination whether the MIP is to be used for the prediction of the current block. This determination may be readily made by checking conditions for the neighboring blocks depending on which it is to be decided whether MIP is to be applied or not. Such conditions may comprise at least one of an intra-prediction mode of the neighboring block adjacent to the current block, the size of the neighboring block adjacent to the current block, and whether or not the neighboring block adjacent to the current block is predicted by the MIP. For example, MIP may be not applied to the prediction of the current block when MIP was not applied for predicting the neighboring block. For example, MIP may be not applied to the prediction of the current block when the size of the neighboring block is below some predetermined threshold (may be a threshold size of 8×8). On the other hand, MIP may be used for the prediction of the current block when the size of the neighboring block adjacent to the current block exceeds a predetermined threshold and the neighboring block adjacent to the current block is predicted by the MIP.

When MIP is to be applied for predicting the current block an MIP intra prediction mode may be obtained by a mapping process if the neighboring block adjacent to the current block and the current block to be predicted have different sizes. Appropriate mapping allows for suitably choosing an MIP intra prediction mode, even if the sizes of the neighboring block adjacent to the current block and the current block to be predicted are different from each other (see detailed description below with reference to Table 6).

According to a further aspect, an MIP intra prediction mode is obtained based on an index within a list of candidate modes as it is described in the detailed description below with reference to Tables 8, 9 and 10. Thereby, it can be efficiently coded which MIP intra prediction mode is to be used. In principle, one of a truncated unary code and a truncated binary code can be used to signal the index with a low data amount.

According to an aspect, the determining of whether the MIP is to be used for the prediction of the current block comprises checking the lengths of vertical and horizontal components of motion vectors that are used to obtain the inter-predicted block. These lengths represent the corresponding distances between the reference frames and the current frame and can thus help to decide on whether or not MIP is to be used with the CIIP of the current block. In particular, it may be determined that the MIP is to be used for the prediction of the current block when the lengths of the vertical and horizontal components of at least one of the motion vectors exceed a predetermined threshold in order to possibly increase the accuracy of the predictor.

Similarly, the determining of whether the MIP is to be used for the prediction of the current block may comprise checking a difference, deltaPOC value, between a picture order counter value of a picture to which the current block belongs and a picture order counter value of a picture to which a block belongs that was used to obtain the inter-predicted block. It may be determined that the MIP is to be used for the prediction of the current block when the absolute deltaPOC value exceeds a predetermined threshold in order to possibly increase the accuracy of the predictor.

A situation may arise in which MIP is not to be used for the prediction of the current block and the neighboring block adjacent to the current block is intra-predicted by an MIP mode and, thus, has an intra-prediction mode that is not consistent with any conventional non-MIP intra-prediction mode. This problem can be overcome by mapping properly MIP modes to conventional non-MIP intra-prediction modes (see detailed description below with reference to Tables 2, 3 and 4).

All of the above-described examples of the method for combined inter-intra prediction of a current block in video coding may advantageously be combined with position dependent prediction combination (PDPC). Thus, the predicting of the current block may comprise performing PDPC on one of a) the intra-predicted block and b) the sum of the intra-block and the inter-predicted block in order to even further increase the accuracy of the predictor. For example, the PDPC is performed only, if it is determined that the MIP is not to be used for the prediction of the current block, since otherwise the predictor by the application of MIP may be already considered accurate enough and further processing may be avoided in order to reduce the computational load of the overall coding process.

The above-mentioned object is also addressed by a method for combined inter-intra prediction of a current block in video coding, comprising: obtaining condition information of the current block; determining whether matrix-based intra prediction, (MIP), is to be used for the prediction of the current block based on the obtained condition information; and determining a prediction of the current block as a weighted sum of an intra-predicted block and an inter-predicted block when it is determined that the MIP is to be used for the prediction of the current block.

According to this aspect, CIIP for the current block is (only) performed when it is determined that the MIP is to be used for the prediction of the current block, i.e., the intra-predicted block used for obtaining the predicted block for the current block. Thus, a particular combination of CIIP and MIP is provided that might be advantageous with respect to the resulting accuracy of the predictor. On the other hand, CIIP may not be applied if MIP is not applied in order to reduce the overall complexity of the coding process.

The condition information may include one of an inter-prediction mode, an intra-prediction mode and a CIIP mode, of a neighboring block adjacent to the current block. By taking into account these different modes appropriate determination of whether or not MIP and, accordingly, CIIP is to be applied, may be achieved with respect to a compromise between coding efficiency and accurateness of prediction.

For example, when the condition information indicates that the neighboring block is predicted by using a CIIP mode, the MIP is to be used for the prediction of the current block in order to possibly increase the accuracy of the predictor.

Similar as described in the context of the method for combined inter-intra prediction of a current block in video coding described-above an MIP intra prediction mode may be obtained by a mapping process when the neighboring block adjacent to the current block and the current block to be predicted have different sizes. Also, an MIP prediction mode may be obtained based on an index of a list of candidate modes and one of a truncated unary code and a truncated binary code may be used to signal the index.

Employing MIP or not may depend on the lengths of vertical and horizontal components of motion vectors that are used to obtain the inter-predicted block and/or a difference, deltaPOC value, between a picture order counter value of a picture to which the current block belongs and a picture order counter value of a picture to which a block belongs.

Thus, obtaining the condition information comprises checking the lengths of vertical and horizontal components of motion vectors that are used to obtain the inter-predicted block. It may be determined that the MIP is to be used for the prediction of the current block when the lengths of the vertical and horizontal components of at least one of the motion vectors exceed a predetermined threshold in order to possible increase the accuracy of the predictor in such a case.

Accordingly, obtaining the condition information may comprise checking a difference, deltaPOC value, between a picture order counter value of a picture to which the current block belongs and a picture order counter value of a picture to which a block belongs that was used to obtain the inter-predicted block and it may be determined that the MIP is to be used for the prediction of the current block when the absolute deltaPOC value exceeds a predetermined threshold.

Further, it is provided an encoder or a decoder comprising processing circuitry for carrying out the method according to any one of the above-described examples. Similarly, it is provided a computer program product comprising a program code for performing the method according to any one of the above-described examples.

Furthermore, video coding devices are provided in order to address the above-mentioned object that provide the same advantageous as the above-described methods. In particular, it is provided a video coding device, comprising: a prediction information determination unit configured to determine prediction information for a neighboring block adjacent to a current block, the prediction information comprising a prediction mode used for prediction of the neighboring block; a matrix-based intra prediction, (MIP), determination unit configured to determine whether MIP is to be used for the prediction of the current block; and a prediction unit configured to predict the current block as a weighted sum of an intra-predicted block and an inter-predicted block and determining weights of the inter-predicted block and the intra-predicted block based on the prediction information for the neighboring block and the determining whether MIP is to be used for the prediction of the current block.

The prediction information may comprise an inter-prediction mode and an intra-prediction mode. The prediction information determination unit may be configured to determine that the prediction mode used for prediction of the neighboring block is a CIIP mode. The prediction information determination unit may be further configured to determine additional prediction information for n additional neighboring blocks adjacent to said current block, the additional prediction information comprising prediction modes used for prediction of the n additional neighboring block, n being an integer between 1 and the number of all neighboring blocks adjacent to said current block minus 1 and the prediction unit may be configured to determine the weights of the inter-predicted block and the intra-predicted block based on the additional prediction information.

Further, the prediction unit may be configured to predict the intra-predicted block by a predefined intra-prediction mode.

Further, the prediction unit may be configured to predict the intra-predicted block by a selected intra-prediction mode. It may be configured to predict the inter-predicted block by at least one of a merge mode, motion estimation, and Frame-Rate Up-Conversion.

The weights of the inter-predicted block and the intra-predicted block may depend on at least one of the number of inter-predicted neighboring blocks adjacent to said current block, the number of intra-predicted neighboring blocks adjacent to said current block and the number of CIIP predicted neighboring blocks adjacent to said current block. For example, the higher the number of intra-predicted neighboring blocks adjacent to said current block is, the higher is the weight of the intra-predicted block.

According to another aspect, the prediction unit is configured to determine the weight of the inter-predicted block complementarily to the weight of the intra-predicted block.

According to another aspect, the MIP determination unit may be configured to determine whether the MIP is to be used for the prediction of the current block based on checking conditions for the neighboring blocks.

The conditions for the neighboring blocks may comprise at least one of an intra-prediction mode of the neighboring block adjacent to the current block, the size of the neighboring block adjacent to the current block, and whether or not the neighboring block adjacent to the current block is predicted by the MIP.

According to another aspect, the MIP determination unit may be configured to determine that the MIP is to be used for the prediction of the current block when the size of the neighboring block adjacent to the current block exceeds a predetermined threshold and the neighboring block adjacent to the current block is predicted by the MIP.

The MIP determination unit may be configured to obtain an MIP intra prediction mode by a mapping process if the neighboring block adjacent to the current block and the current block to be predicted have different sizes. It may be configured to obtain an MIP intra prediction mode based on an index within a list of candidate modes. Hereby, a truncated unary code or a truncated binary code may be used to signal the index.

According to another aspect, the MIP determination unit is configured to determine whether MIP is to be used for the prediction of the current block based on checking the lengths of vertical and horizontal components of motion vectors that are used to obtain the inter-predicted block. The MIP determination unit may, particularly, be configured to determine that the MIP is to be used for the prediction of the current block when the lengths of the vertical and horizontal components of at least one of the motion vectors exceed a predetermined threshold.

According to another aspect, the MIP determination unit is configured to determine whether the MIP is to be used for the prediction of the current block based on checking a difference, deltaPOC value, between a picture order counter value of a picture to which the current block belongs and a picture order counter value of a picture to which a block belongs that was used to obtain the inter-predicted block. The MIP determination unit may be configured to determine that the MIP is to be used for the prediction of the current block when the absolute deltaPOC value exceeds a predetermined threshold.

Furthermore, the prediction unit may be configured to, when it is determined that the MIP is not to be used for the prediction of the current block and the neighboring block adjacent to the current block is intra-predicted by an MIP mode, obtain an intra prediction mode for obtaining the intra-predicted block by a mapping process.

The prediction unit may be configured to predict the current block by performing position dependent prediction combination (PDPC) on one of a) the intra-predicted block and b) the sum of the intra-block and the inter-predicted block.

Further, the prediction unit may be configured to perform the PDPC only, if it is determined that the MIP is not to be used for the prediction of the current block.

Moreover, it is provided a video coding device, comprising: a condition information obtaining unit configured to obtain condition information of a current block to determine whether matrix-based intra prediction, MIP, is to be used for the prediction of the current block; and a prediction unit configured to determine a prediction of the current block as a weighted sum of an intra-predicted block and an inter-predicted block when it is determined that the MIP is to be used for the prediction of the current block.

In this device the condition information may include one of an inter-prediction mode, an intra-prediction mode and a CIIP mode, of a neighboring block adjacent to the current block. The condition information obtaining unit may be configured to determine that the MIP is to be used for the prediction of the current block when the condition information indicates that the neighboring block is predicted by using a CIIP mode.

The prediction unit may be configured to obtain an MIP intra prediction mode by a mapping process when the neighboring block adjacent to the current block and the current block to be predicted have different sizes. Further, the prediction unit may be configured to obtain an MIP prediction mode based on an index of a list of candidate modes, wherein one of a truncated unary code and a truncated binary code may be used to signal the index.

According to an aspect, the condition information obtaining unit is configured to obtain the condition information by checking the lengths of vertical and horizontal components of motion vectors that are used to obtain the inter-predicted block. According to another aspect, the condition information obtaining unit is configured to determine that the MIP is to be used for the prediction of the current block when the lengths of the vertical and horizontal components of at least one of the motion vectors exceed a predetermined threshold.

According to another aspect, the condition information obtaining unit is configured to obtain the condition information by checking a difference, deltaPOC value, between a picture order counter value of a picture to which the current block belongs and a picture order counter value of a picture to which a block belongs that was used to obtain the inter-predicted block. The condition information obtaining unit may be configured to determine that the MIP is to be used for the prediction of the current block when the absolute deltaPOC value exceeds a predetermined threshold.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
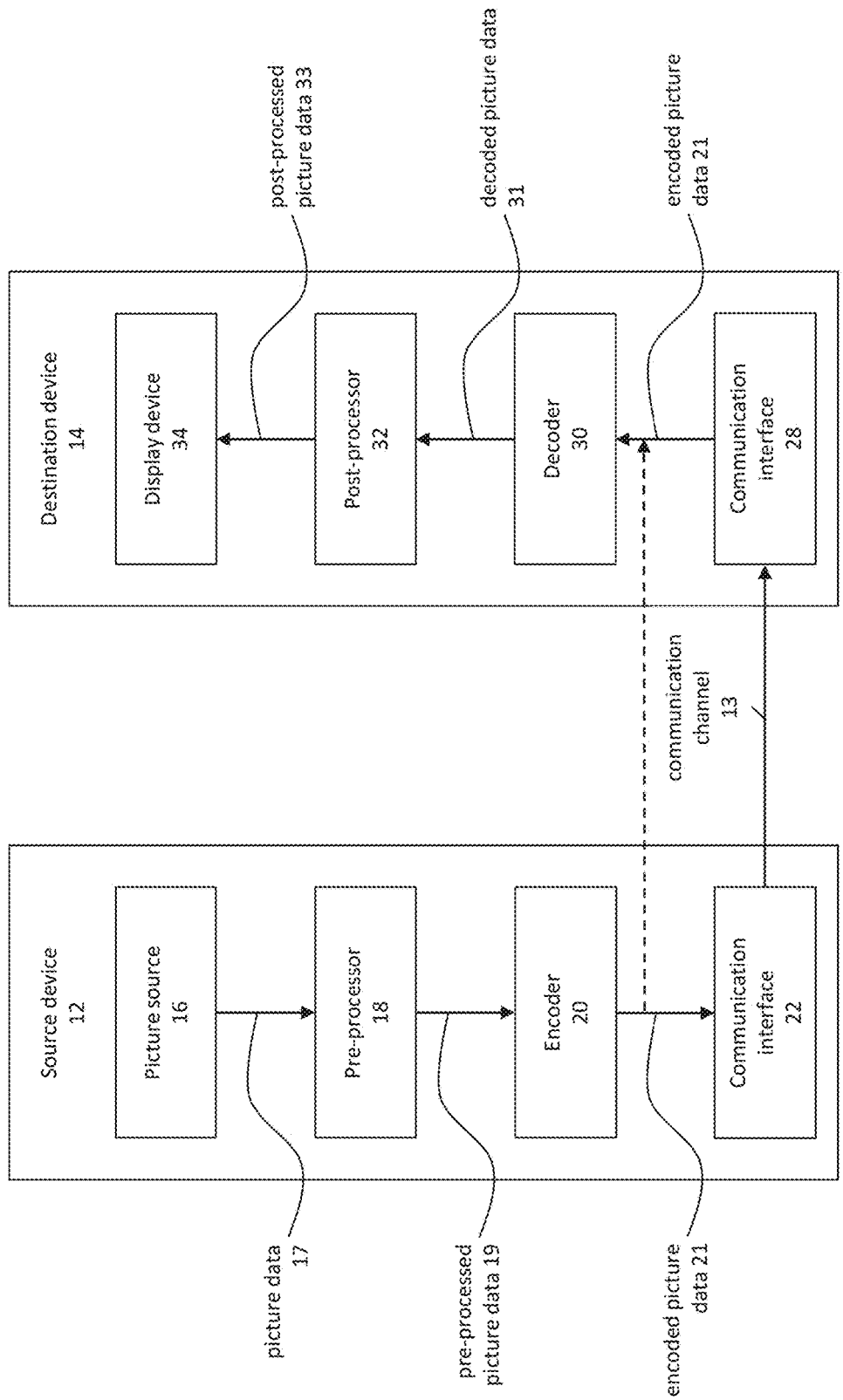
FIG. 1A is a block diagram showing an example of a video coding system configured to implement embodiments of the disclosure.

In the following, identical reference signs refer to identical or at least functionally equivalent features if not explicitly specified otherwise.

DETAILED DESCRIPTION

In the following description, reference is made to the accompanying figures, which form part of the disclosure, and which show, by way of illustration, exemplary aspects of embodiments of the disclosure or exemplary aspects in which embodiments of the present disclosure may be used. It is understood that embodiments of the disclosure may be used in other aspects and comprise structural or logical changes not depicted in the figures. The following detailed description, therefore, is not to be taken in a limiting sense.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e., the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e., the quality of the reconstructed video pictures is lower or worse compared to the quality of the original video pictures.

Several video coding standards belong to the group of "lossy hybrid video codecs" (i.e., combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e., encoded, on a block (video block) level, e.g., by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e., coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g., a video coding system 10 (or short coding system 10) that may utilize techniques of this present disclosure. Video encoder 20 (or short encoder 20) and video decoder 30 (or short decoder 30) of video coding system 10 represent examples of devices that may be configured to perform techniques in accordance with various examples described in the present disclosure.

As shown in FIG. 1A, the coding system 10 comprises a source device 12 configured to provide encoded picture data 21 e.g., to a destination device 14 for decoding the encoded picture data 13.

The source device 12 comprises an encoder 20, and may additionally, i.e., optionally, comprise a picture source 16, a pre-processor (or pre-processing unit) 18, e.g., a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from red, green and blue (RGB) to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder 30), and may additionally, i.e., optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
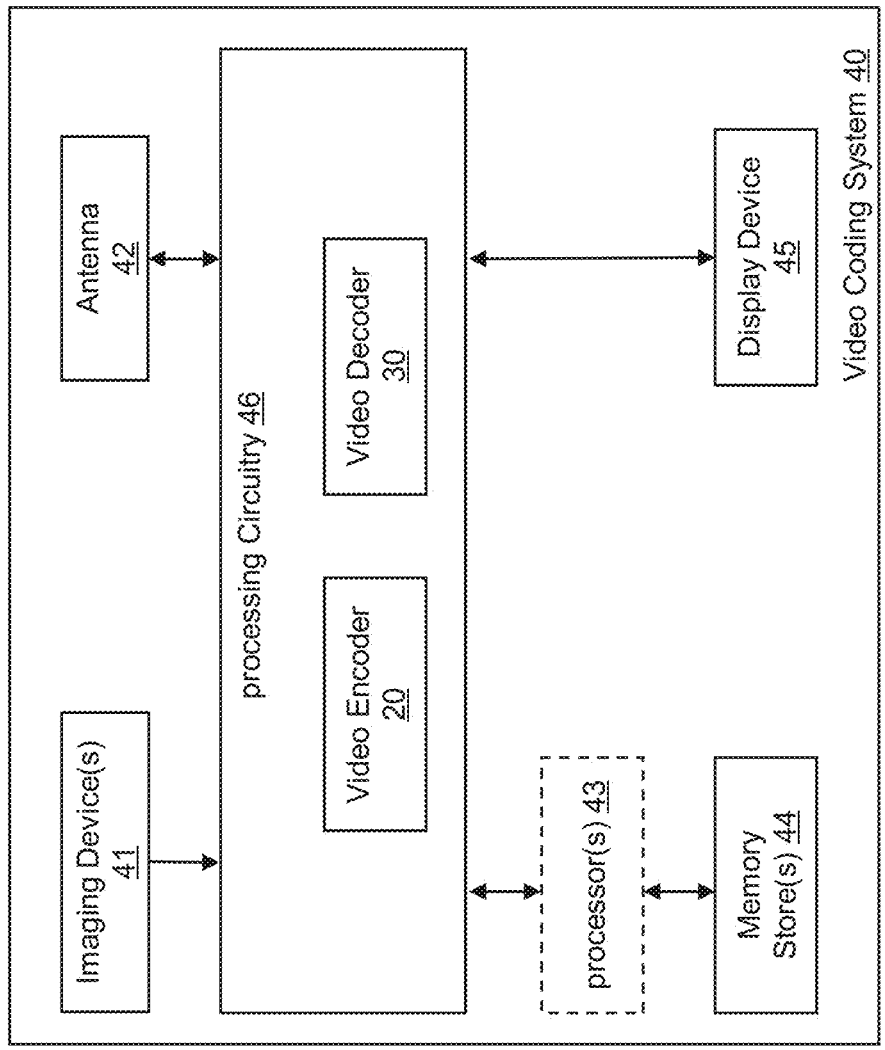
FIG. 1B is a block diagram showing another example of a video coding system configured to implement embodiments of the disclosure.

The encoder 20 (e.g., a video encoder 20) or the decoder 30 (e.g., a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
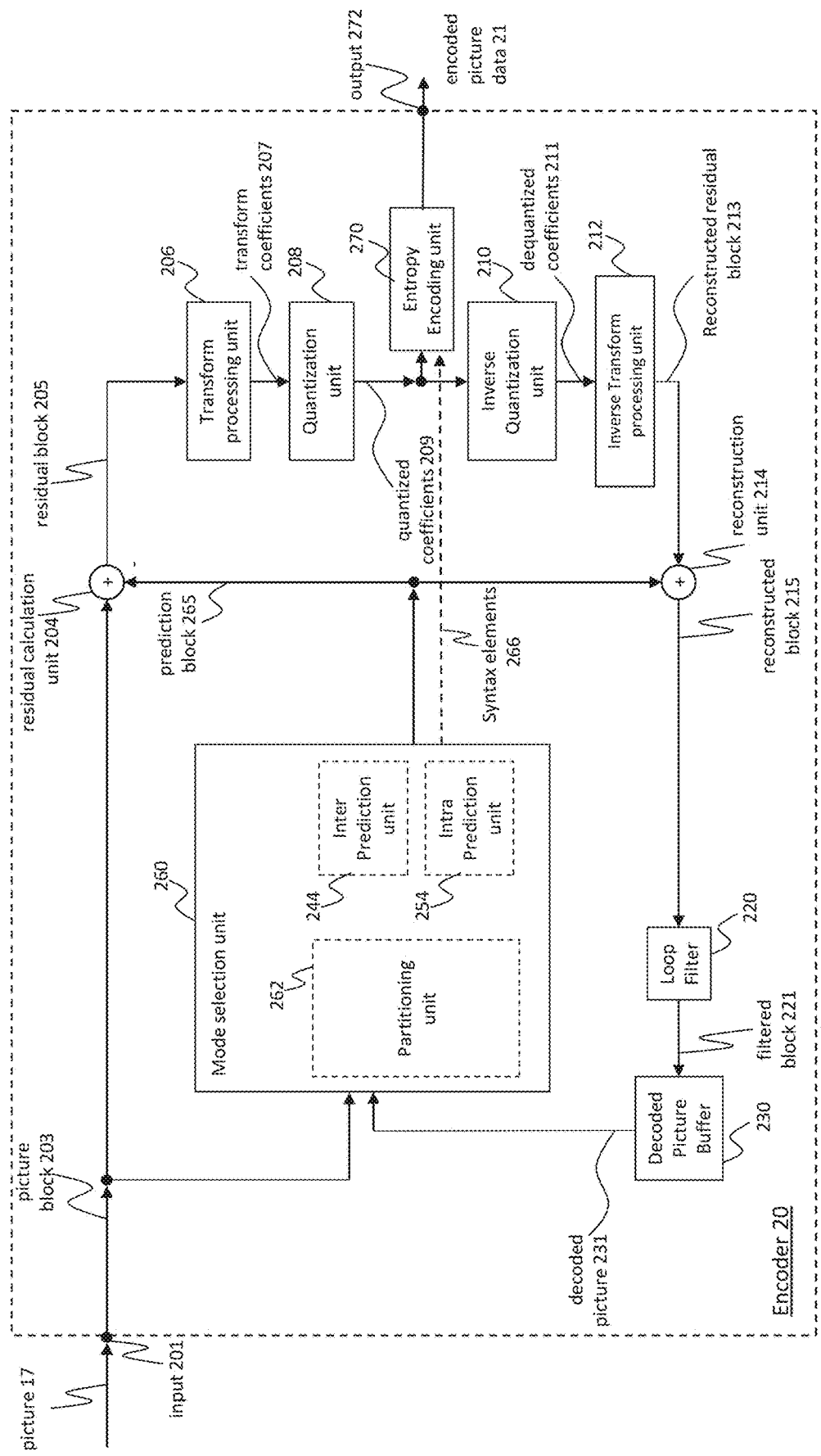
FIG. 2 is a block diagram showing an example of a video encoder configured to implement embodiments of the disclosure.

FIG. 2 shows a schematic block diagram of an example video encoder 20 that is configured to implement the techniques of the present disclosure. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
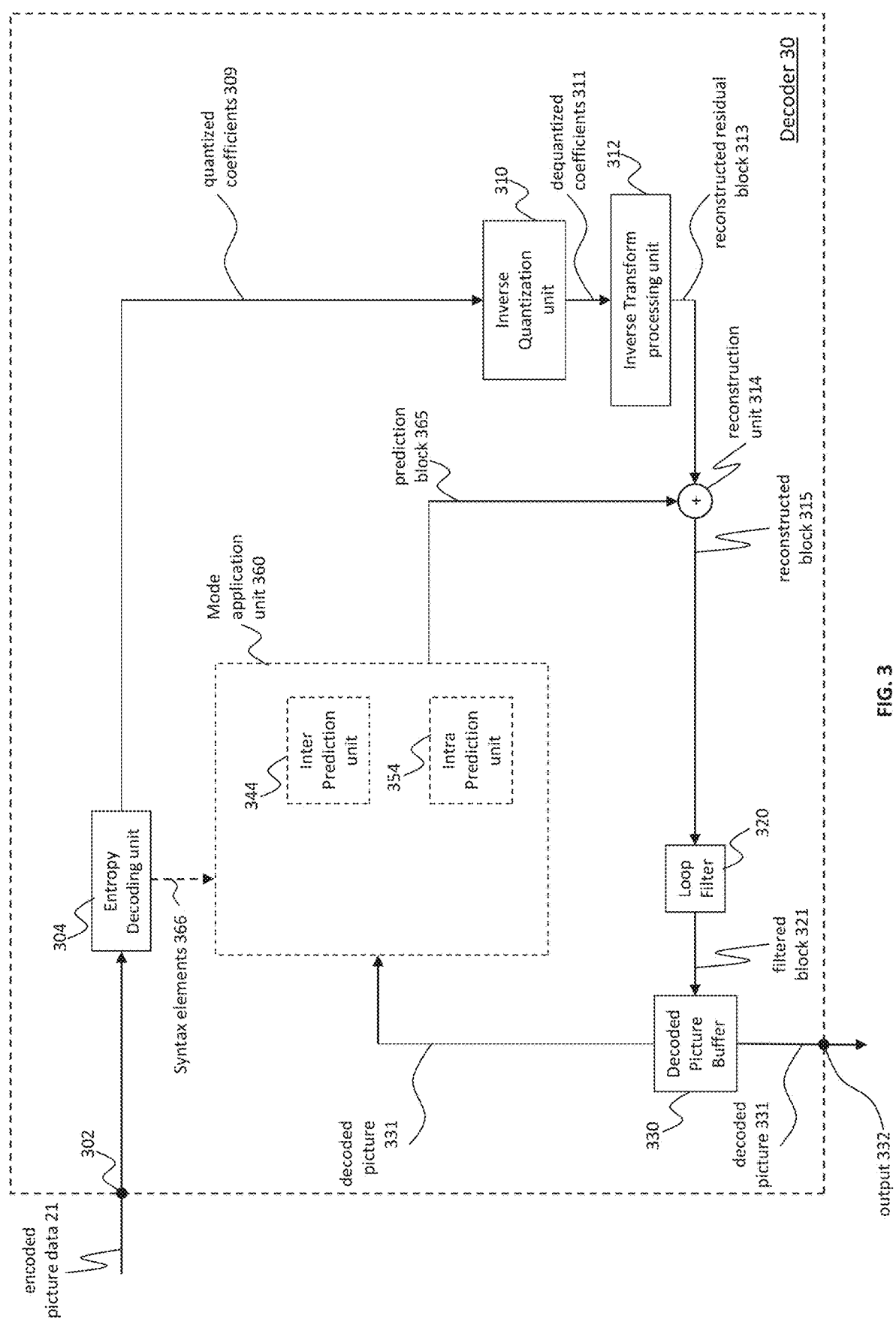
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g., via input 201, a picture 17 (or picture data 17), e.g., picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, i.e., the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e., the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g., the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g., CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g., one or more blocks (e.g., CTUs) or one or more tiles, wherein each tile, e.g., may be of rectangular shape and may comprise one or more blocks (e.g., CTUs), e.g., complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g., by inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively quantization unit 208) may be configured to output quantization parameters (QP), e.g., directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g., an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g., adder or summer 214) is configured to add the transform block 213 (i.e., reconstructed residual block 213) to the prediction block 265 to obtain a reconstructed block 215 in the sample domain, e.g., by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e., decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (current) picture and/or from one or a plurality of previously decoded pictures, e.g., from decoded picture buffer 230 or other buffers (e.g., line buffer, not shown). The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e., select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g., smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g., a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g., pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e., previous at least partially decoded pictures, e.g., stored in DPB 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g., reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g., in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present disclosure. The video decoder 30 is configured to receive encoded picture data 21 (e.g., encoded bitstream 21), e.g., encoded by encoder 20, to obtain a decoded picture 331. The encoded picture data or bitstream comprises information for decoding the encoded picture data, e.g., data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g., a summer 314), a loop filter 320, a decoded picture buffer (DPB) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the DPB 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g., any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g., by parsing and/or decoding, e.g., by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in DPB 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g., motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g., video tile groups) and/or tiles (e.g., video tiles) in addition or alternatively to slices (e.g., video slices), e.g., a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g., video tile groups) and/or tiles (e.g., video tiles) in addition or alternatively to slices (e.g., video slices), e.g., a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g., CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g., one or more blocks (e.g., CTUs) or one or more tiles, wherein each tile, e.g., may be of rectangular shape and may comprise one or more blocks (e.g., CTUs), e.g., complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g., the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = (mvx + 2^{bitDepth}) \% 2^{bitDepth} \quad (1)$$

$$mvx = (ux >= 2^{bitDepth-1})?(ux - 2^{bitDepth}):ux \quad (2)$$

$$uy = (mvy + 2^{bitDepth}) \% 2^{bitDepth} \quad (3)$$

$$mvy = (uy >= 2^{bitDepth-1})?(uy - 2^{bitDepth}):uy \quad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111,1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% 2^{bitDepth} \quad (5)$$

$$mvx = (ux >= 2^{bitDepth-1})?(ux - 2^{bitDepth}):ux \quad (6)$$

$$uy = (mvpy + mvdy + 2^{bitDepth}) \% 2^{bitDepth} \quad (7)$$

$$mvy = (uy >= 2^{bitDepth-1})?(uy - 2^{bitDepth}):uy \quad (8)$$

The operations may be applied during the sum of mvp and mvd, as shown in formula (5) to (8).

Method 2: remove the overflow MSB by clipping the value $$vx = Clip3(-2^{bitDepth-1}, 2^{bitDepth-1}-1, vx)$$

$$vy = Clip3(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$Clip3(x, y, z) = \begin{cases} x; & z < x \\ y; & z > y \\ z; & \text{otherwise} \end{cases}$$

Figure 4:
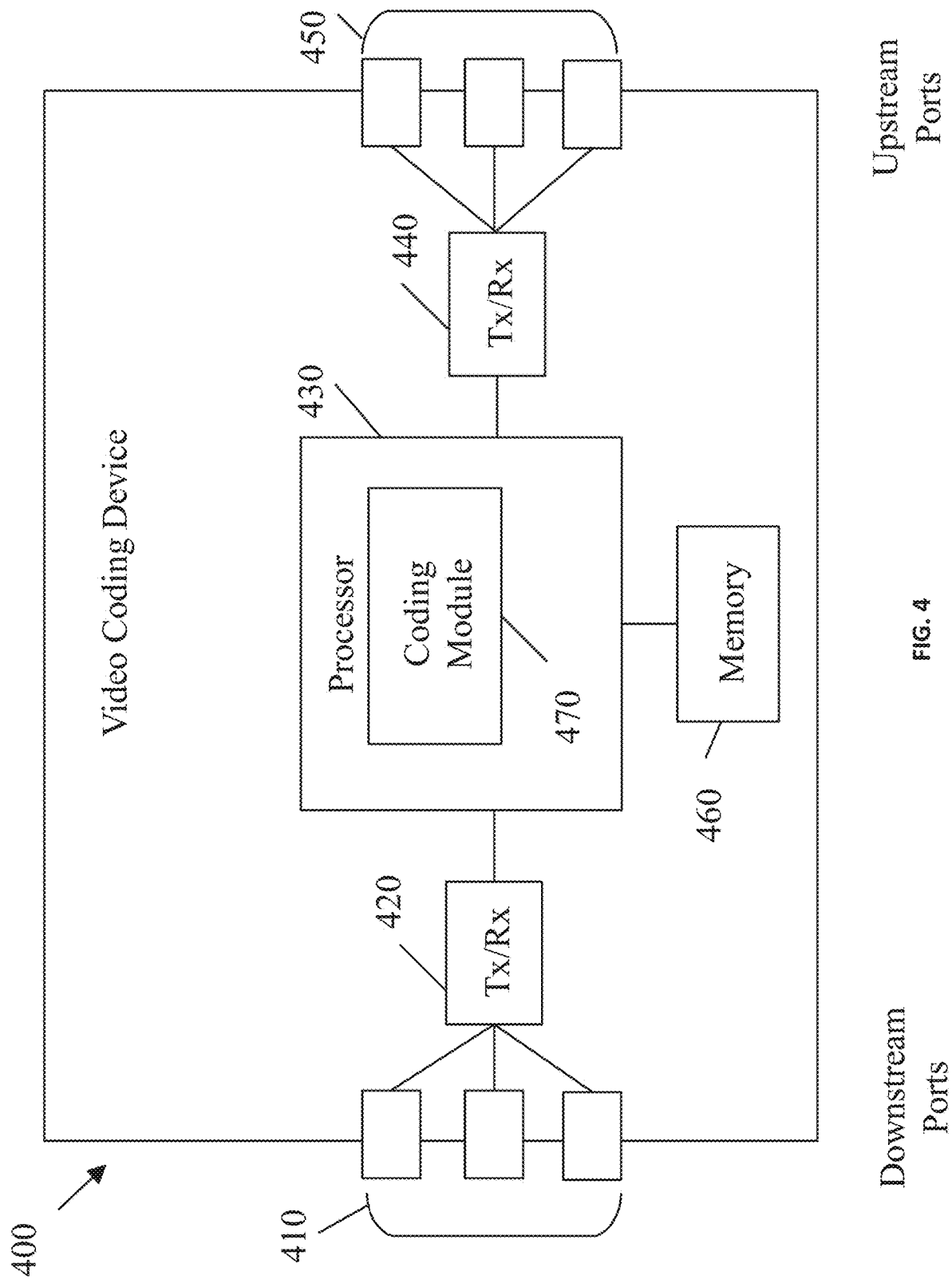
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
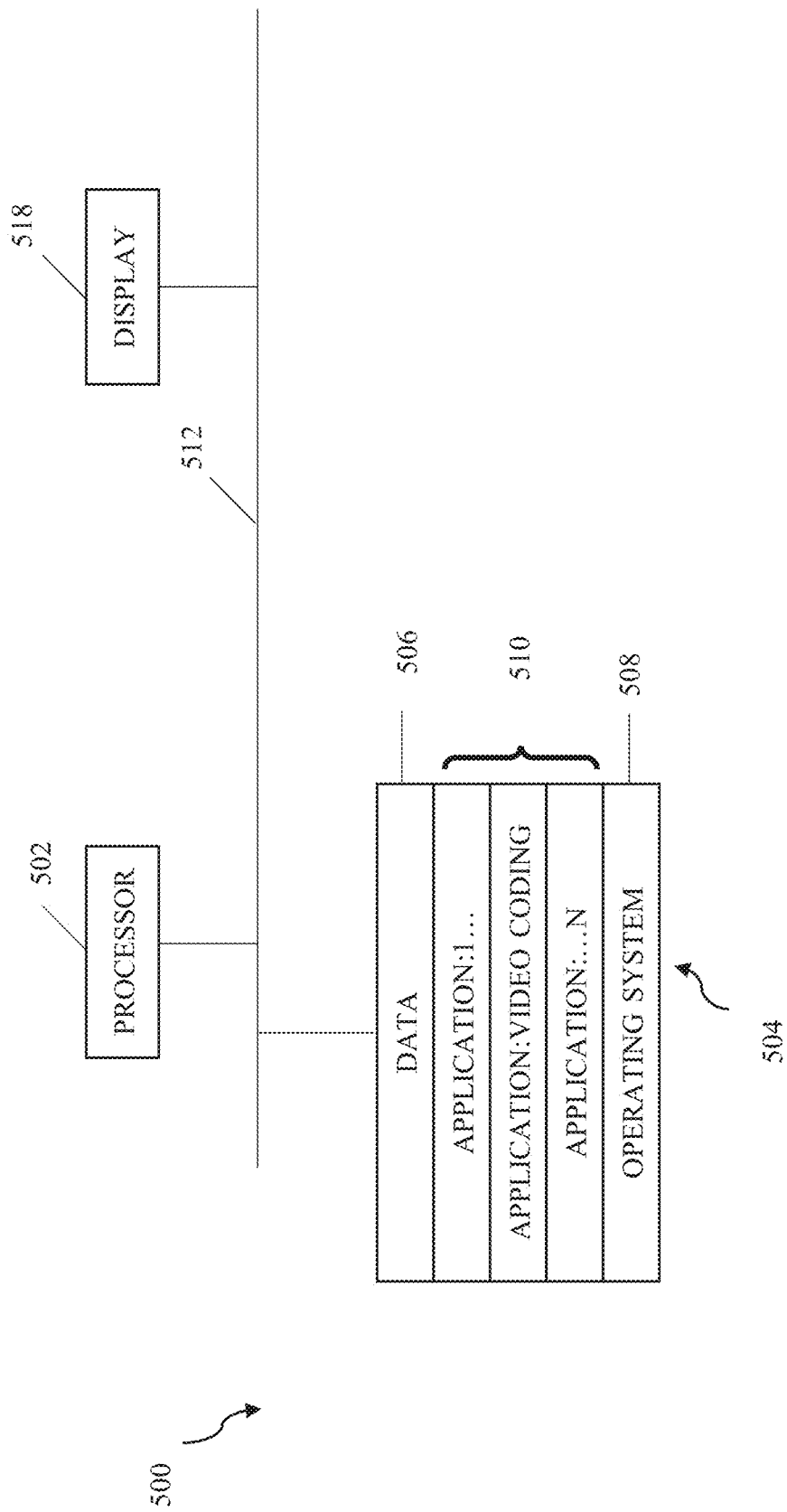
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Figure 6:
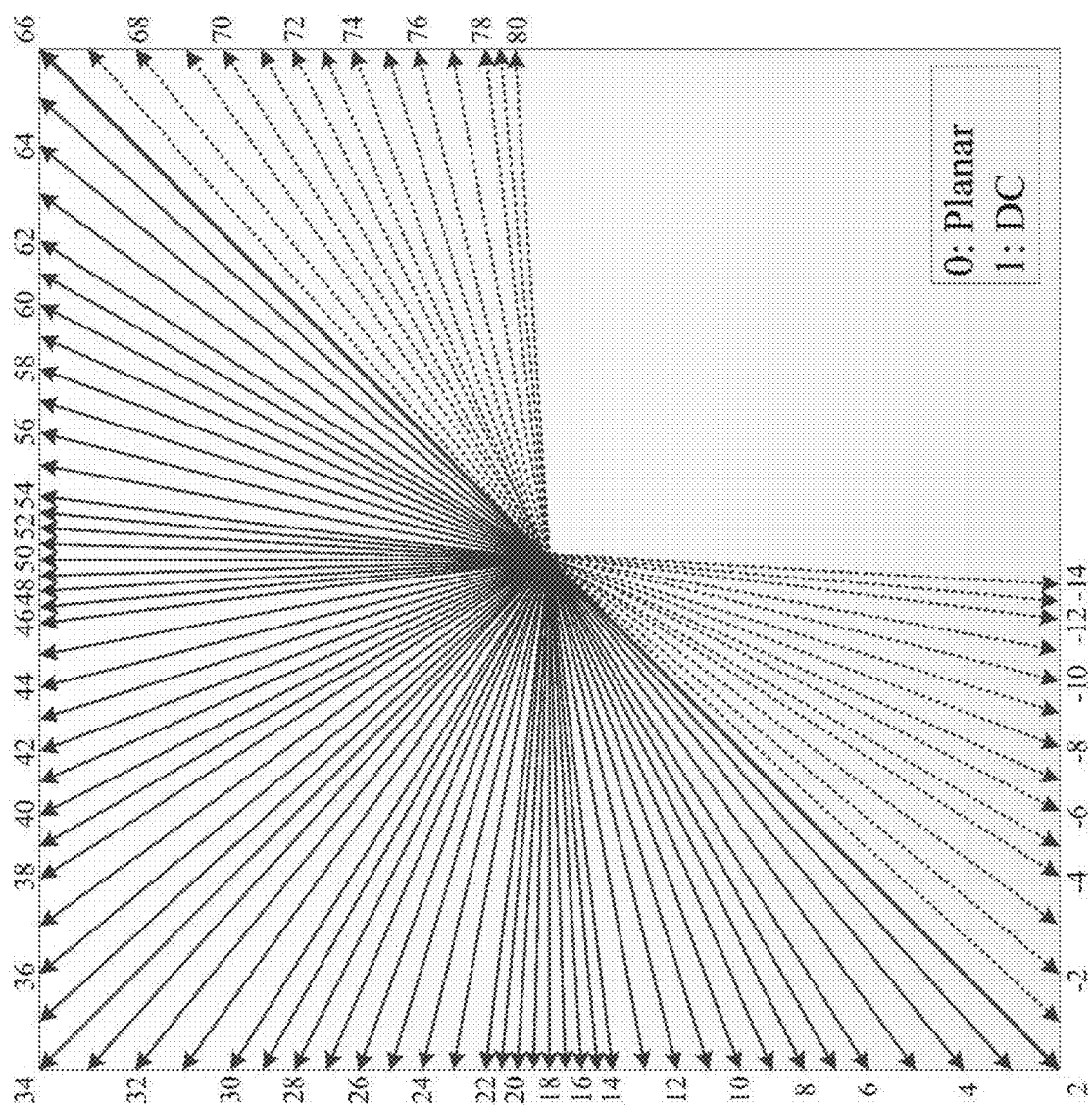
FIG. 6 shows exemplary angular intra prediction directions and the associated intra-prediction modes.

FIG. 6 gives an example of directional intra prediction modes. The arrows in the figure indicate selectable intra-prediction directions. In particular, in FIG. 6, the horizontal intra prediction mode is denoted as mode 18, and vertical intra prediction mode is denoted as mode 50.

In contribution JVET-J0053, "Intra-prediction Mode Propagation for Inter-pictures", San Diego, US, Apr. 10-20, 2018, an intra-inter prediction method has been proposed as an additional possible prediction mode to be used in video coding and decoding. With inter-intra prediction on the luma component, a prediction block P1 is generated using intra-prediction with the propagated intra-prediction mode, IPM, of the top-left 4×4 sub-block in the current CU, and another prediction block P2 is generated using inter-prediction with motion information of the current CU. The final prediction block P is generated as the weighted sum of prediction blocks P1 and P2 as shown below:

$$P(x,y)=(w1(x,y)\times P1(x,y)+w2(x,y)\times P2(x,y))>>s,$$

where (x, y) are the coordinates of a sample in the current block (CU). w1 is the weighting value for P1, w2 is the weighting value for P2, and $w1+w2=2^s$. s is an integer larger than zero.

For luma coding, the weighting values w1 and w2 are position-dependent, which can be calculated by a quadratic function as:

$$w1(x,y)=(a\times x^2+b\times y^2+c\times x\times y+d\times x+e\times y+f)>>s, P(x,y)=w1(x,y)\times P1(x,y)+w2(x,y)\times P2(x,y)$$

where the six parameters a, b, c, d, e, and fP(x, y)=w1(x, y)×P1(x, y)+w2(x, y)×P2(x, y) are off-line trained.

The inter-intra prediction mechanism proposed in JVET-J0053 can be applied to inter-coded blocks with merge-mode or FRUC-mode.

The term merge mode allows for the motion information (e.g., one or more motion vectors) to be inherited from neighboring prediction blocks. In particular, at the encoder and the decoder, a list of candidate motion vectors is generated in the same manner. Then, instead of signaling motion vector for a block, it is sufficient to signal an index which points to the selected candidate in the list.

The term FRUC refers to Frame-Rate Up-Conversion. FRUC is used to increase the temporal resolution (frame rate) of the video. It derives motion information between two (e.g., successive) pictures in the video and interpolates an intermediate picture according to the motion information. The motion information may include, e.g., motion vector and/or reference picture. No additional signalling is required to support FRUC.

According to JVET-J0053, for a CU with merge-mode, up to four more inter-intra merge candidates are inserted into the candidate list. An inter-intra merge candidate copies the motion information of a normal merge candidate previously inserted. Accordingly, the size of merge candidate list is increased by four. At the encoder, only four more Sum of Absolute Transformed Differences (SATD) checks are required while no additional RDO checks are needed. For a CU with FRUC-mode, an additional flag is signaled when inter-intra prediction is applicable. Inter-intra prediction is used if the flag is equal to 1. At the encoder, one more RDO test with inter-intra prediction is added for each FRUC mode.

Inter-intra prediction in JVET-J0053 is only applicable when both the width and height of the CU is no larger than 64. However, it is noted that in general, in some embodiments of the present disclosure, there is no such limitation and the inter-intra prediction may be applied to a CU of any size.

Contribution JVET-L0100, "CE10.1.1: Multi-hypothesis prediction for improving AMVP mode, skip or merge mode, and intra mode", Macao, CN, Oct. 3-12, 2018, describes a similar method referred to as multi-hypothesis prediction. When the multi-hypothesis prediction is applied to improve an intra mode, multi-hypothesis prediction combines one intra prediction and one inter prediction that uses merge CU mode, i.e., signals the index value that is used for derivation of motion vectors and reference indices. In a merge CU mode, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM_CHROMA is always applied without extra signaling, i.e., intra prediction mode of luma component is being used. DM_CHROMA indicates that the prediction mode to be used is the same as that of the co-located luma block.

When DC or planar mode is selected as the intra mode or the block width or height is smaller than 4, equal weights are applied for the intra prediction and inter prediction. For those blocks with width and height larger than or equal to 4, when horizontal/vertical mode is selected, predicted samples of the block are first vertically/horizontally split into four equal-area regions. Each weight set, denoted as ($w\_intra_i$, $w\_inter_i$), where i is from 1 to 4 and ($w\_intra_1$, $w\_inter_1$)=(6, 2), ($w\_intra_2$, $w\_inter_2$)=(5, 3), ($w\_intra_3$, $w\_inter_3$)=(3, 5), and ($w\_intra_4$, $w\_inter_4$)=(2, 6), will be applied to a corresponding region. ($w\_intra_1$, $w\_inter_1$) is for the region closest to the reference samples and ($w\_intra_4$, $w\_inter_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring blocks.

Another name of the method described in JVET-L0100 is Combined Intra-Inter-prediction (CIIP). This name will be further used for the methods that combine results of intra and inter prediction to obtain prediction for a current block (CU).

In contribution JVET-M0096, "CE10-related: Inter-intra prediction combination", Marrakech, MA, Jan. 9-18, 2019, a modified blending technique for inter-intra prediction is described. Firstly, only the intra planar mode is allowed in the inter-intra mode. Secondly, the weights for planar and merge predicted samples and neighbouring reconstructed samples are adaptively selected in the blending process.

Figure 7:
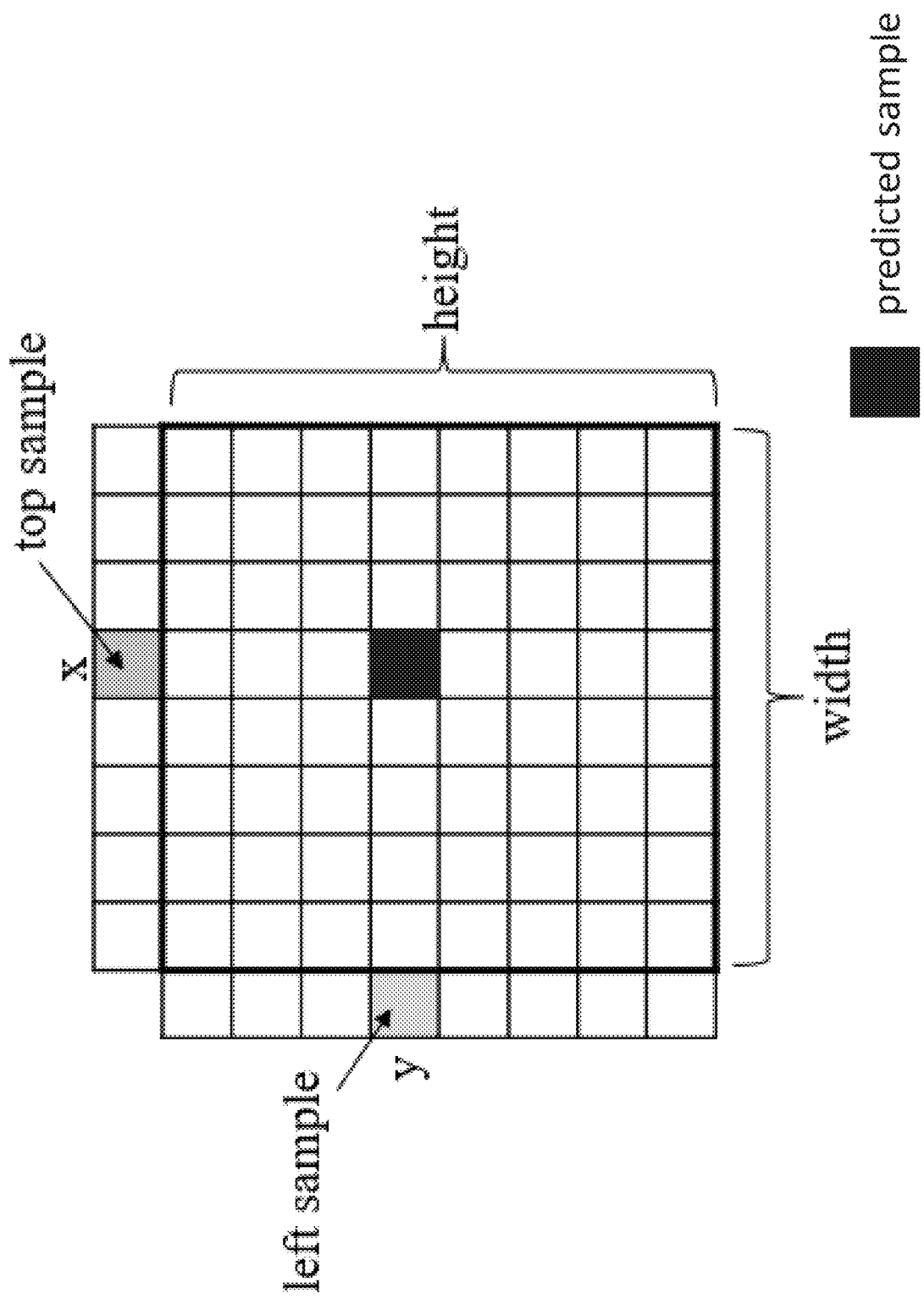
FIG. 7 shows left and top reconstructed samples used in inter-intra blending.

In the first aspect, the mode is simplified by reducing the number of intra modes allowed in inter-intra prediction from 4 to only 1, i.e., planar mode. In the second aspect, the performance of the inter-intra mode is enhanced by a position dependent inter-intra combination. In this combination scheme, the top and left reconstructed samples are blended with the merge and planar predicted samples using a position-dependent weight. This is illustrated in FIG. 7. FIG. 7 shows a sample of an 8×8 current CU which is predicted based on the top sample x and the left sample y.

Figure 8:
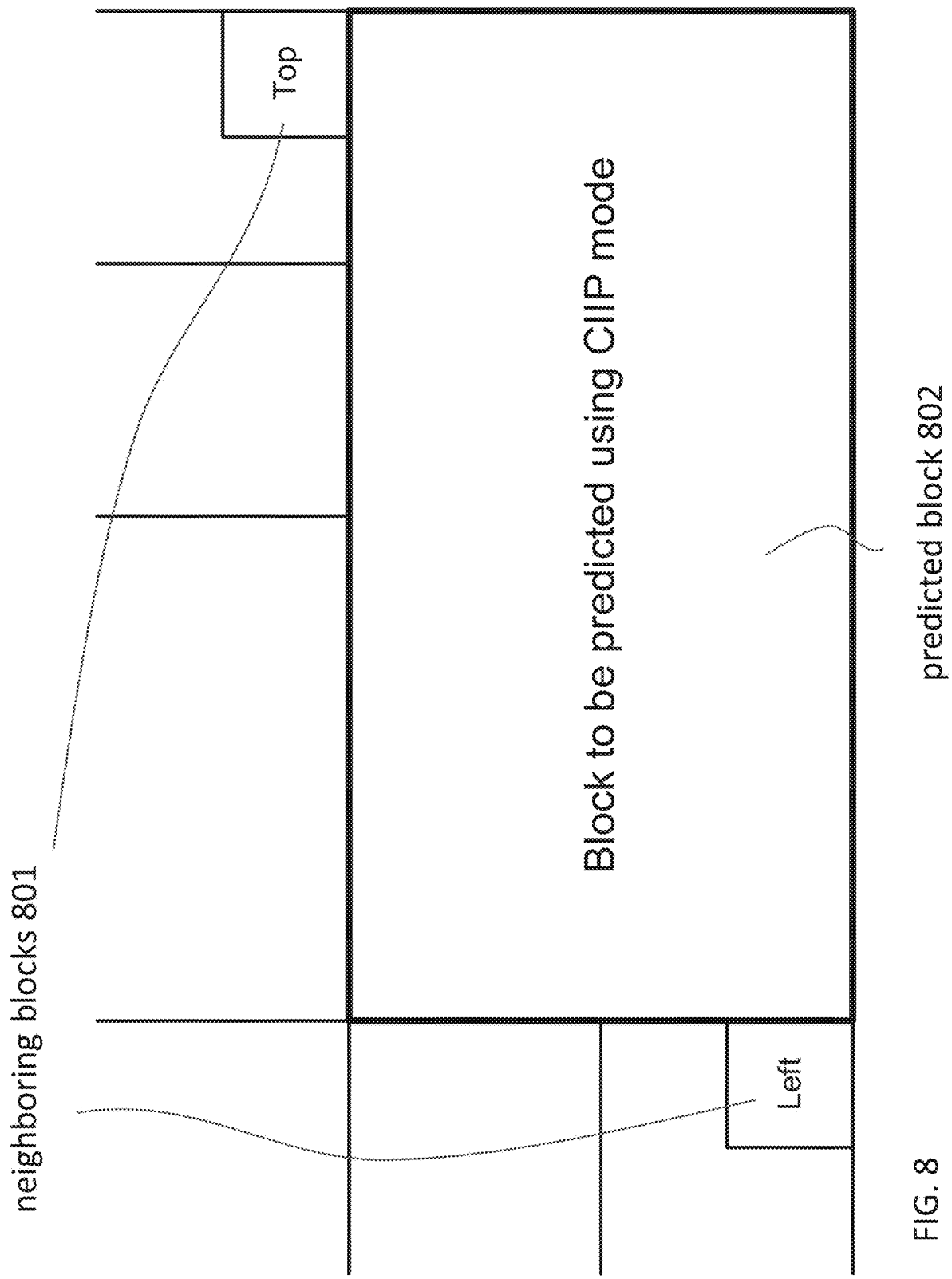
FIG. 8 is a schematic drawing showing an example of spatial positions of the neighboring blocks used in weight determination relative to the block being predicted.

Moreover, the weight for intra and inter predicted samples are adaptively selected based on the number of neighbouring intra-coded blocks (illustrated in FIG. 8). The blending is performed using the following equation:

pred(x,y)=(wT*top<<2+wL*left<<2+(32−wL−wT)*
(wInter*Merge(x,y)+wIntra*PL(x,y))+64)>>7;

where wT=16>>((y<<1)>>scl)

wL=16>>((x<<1)>>scl)

scl=(log$_2$(width)+log$_2$(height)−2)>>2

The (wIntra, wInter) weights are adaptively set as follows. If both top and left neighbors are intra-coded, (wIntra, wInter) is set equal to (3, 1). Otherwise, if one of these blocks is intra-coded, these weights are identical, i.e., (2, 2), else the weights are set equal to (1, 3).

However, in JVET-M0096, adaptive selection of weight values is based on the determination whether the neighbor block is predicted using either intra- or inter-prediction mode. As this adaptive weight assignment mechanism relies on just one property of the neighboring blocks, further improvement is desirable.

According to an embodiment, multiple properties of the neighboring blocks are determined and used for a finer determination of the weights of the intra- and inter-predicted blocks. Specifically, a neighboring block may be predicted using a combined inter-intra predicted (CIIP) mode, which is not taken into account by any of the above mentioned mechanisms. By considering additional properties of the neighboring blocks, more appropriate values of intra- and inter-weights may be selected in the CIIP method of an embodiment.

This is performed, in particular, by using the weighting information from neighboring blocks to determine the weight(s) for intra- and inter-prediction components of the block being predicted.

Neighboring blocks that are used for determining the weights of inter- and intra-predicted blocks when determining the prediction of a current block may have different positions relative to the current block being predicted. Further, the number of neighboring blocks (denoted further as "num_cand" or number of candidates) used to derive the weight(s) for the current block may also be different. In general, it may be any number of blocks between (and including) one and all of the neighboring blocks.

Exemplary positions of the neighboring blocks which may be used to determine the weights for the CIIP of the current block are shown in FIG. 8-12.

In these figures a prediction for a current block (802, 902, 1002, 1102, 1202) is performed using a CIIP method to get the values of the predicted samples. Weights of the intra- and inter-components (blocks) are determined using the data on prediction modes of the neighboring blocks (801, 901, 1001, 1101, 1201, respectively).

FIG. 8 illustrates the current block 802 to be predicted using a CIIP method and neighboring blocks 801 on the lower left and top right side of the current block 802 according to an embodiment. Blocks 801 are used to derive weight for an intra block and an inter block to form combined prediction block for the current block 802. The intra block may then be derived according to an intra prediction mode such as a DC, planar, vertical or horizontal.

However, the present disclosure is not limited to any particular type of intra prediction and, in general, directional prediction may be used as well.

The intra prediction mode to be applied may be predefined. For example, there may be a single mode such as planar mode supported, e.g., defined by a standard and always used. In another example, the intra mode can be selected out of a plurality of intra modes, e.g., based on the intra modes applied by the neighboring blocks or based on a different kind of determination.

Similarly, the inter prediction may be any other inter prediction including merge mode, motion estimation, FRUC, or any other approach. Similar approaches as mentioned with reference to the contributions mentioned above may be used.

In other words, the present disclosure is applicable to CIIP which weights inter and intra blocks determined in any kind of respective inter and intra prediction.

Figure 9:
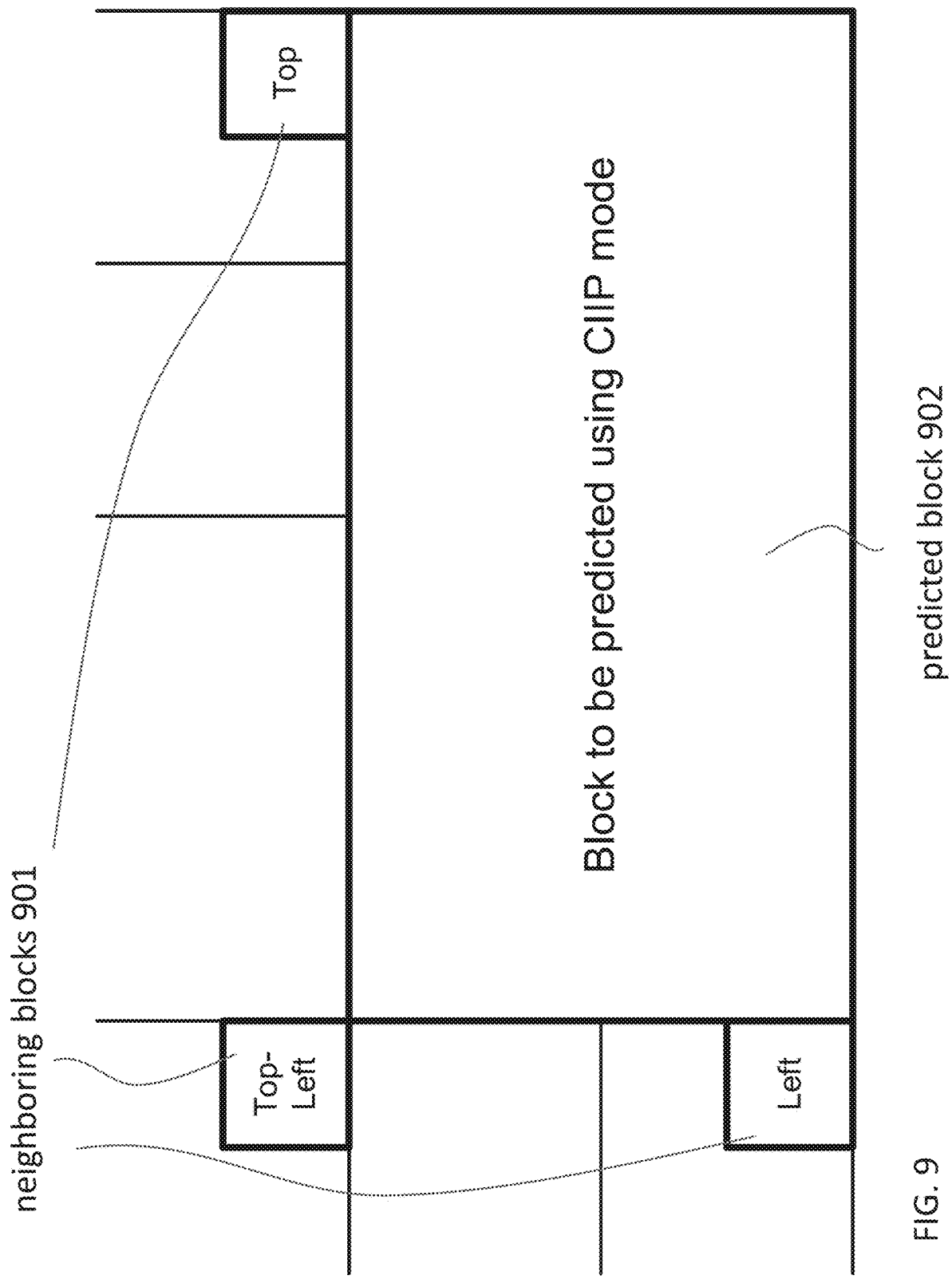
FIG. 9 is a schematic drawing showing an example of spatial positions of the neighboring blocks used in weight determination relative to the block being predicted.

As illustrated in FIG. 9, a top-left neighbor block (diagonally neighboring block on top left) may be used in addition to the top-boundary block most right and the lowest left boundary block 801 to derive weights for CIIP prediction of the current block 902, such that the prediction properties of a total of three neighboring blocks 901 are utilized for determining the weights for CIIP of the current block 902.

Figure 10:
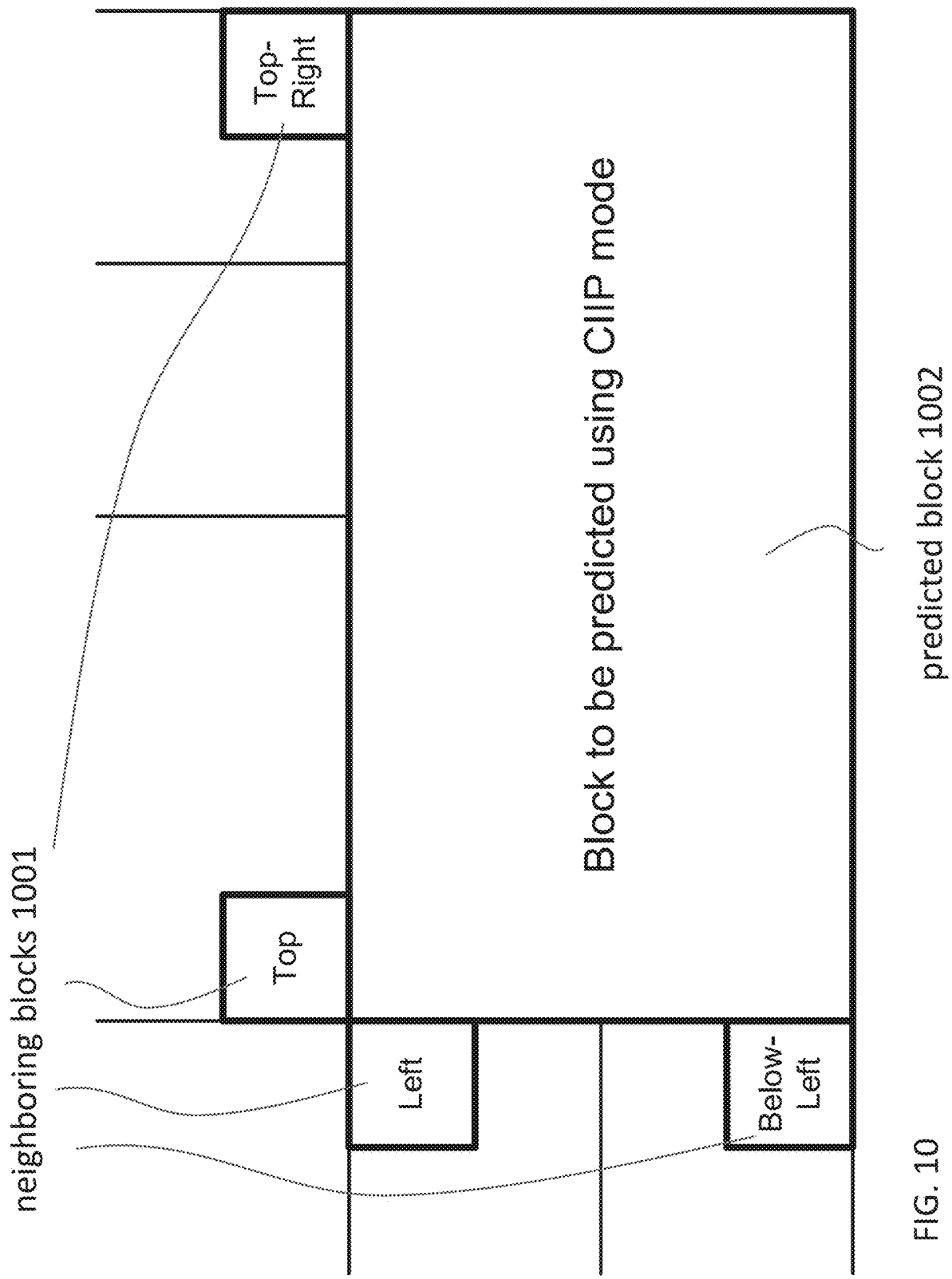
FIG. 10 is a schematic drawing showing an example of spatial positions of the neighboring blocks used in weight determination relative to the block being predicted.

FIG. 10 illustrates another example, wherein a below-left block, an upper-left block, a left top block and a right top block are determined as neighboring blocks 1001. The below-left block here denotes the lowest block on the left boundary of the current CU. The upper left block denotes the highest block sharing the left boundary with the current CU. The right top block denotes block on the top boundary of the current CU, most to the right, whereas the left top block denotes block in the top boundary of the current CU, most to the left. The weights for prediction of the current block 1002 may be determined based on the prediction properties of the neighboring blocks 1001.

Figure 11:
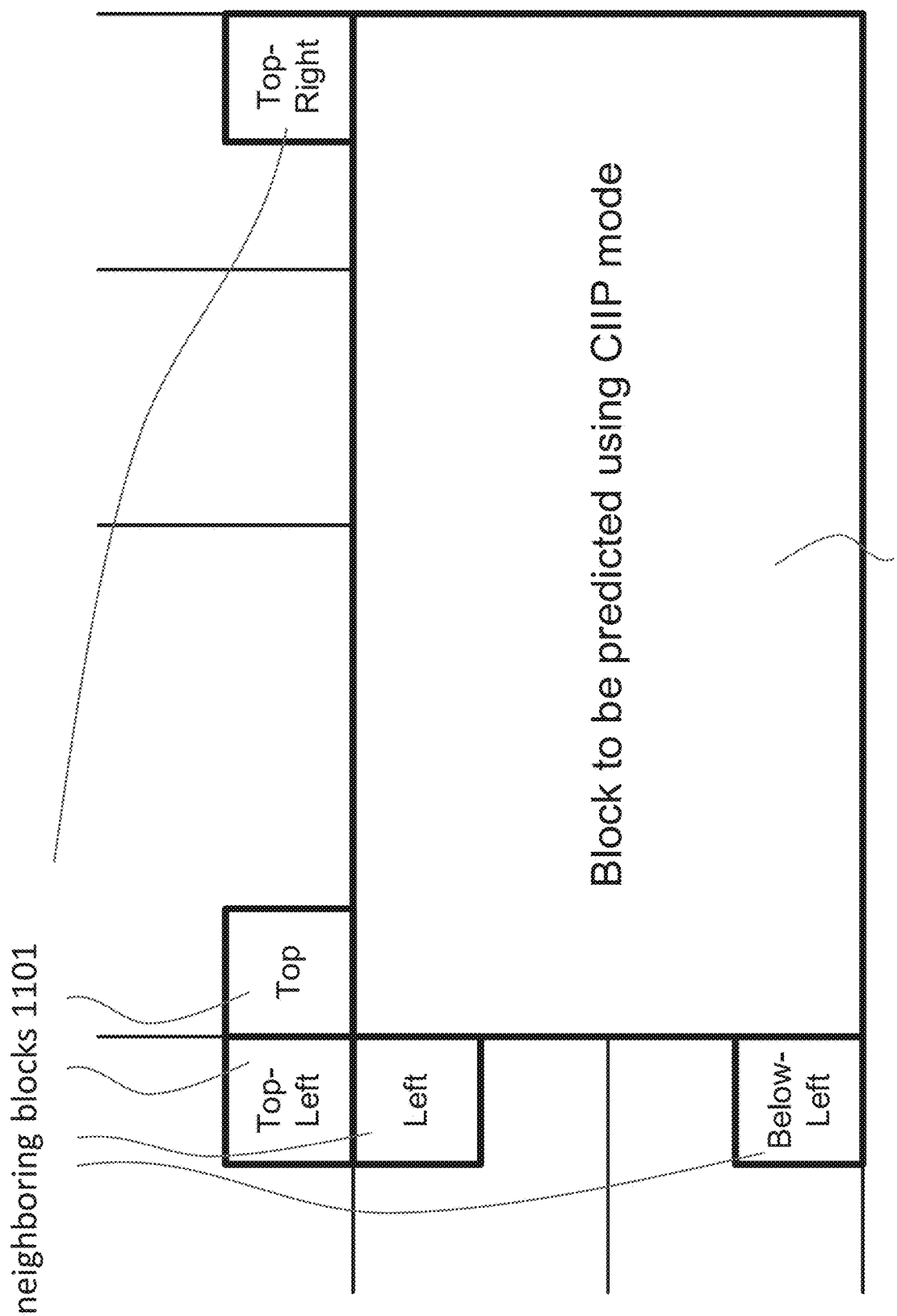
FIG. 11 is a schematic drawing showing an example of spatial positions of the neighboring blocks used in weight determination relative to the block being predicted.

Further, FIG. 11 illustrates another example wherein, in addition to below left, left, top and top-right blocks, a fifth block, the top-left block is included in the plurality of neighboring blocks 1101 to serve as basis for determining the weights for prediction of the current block 1102 according to a CIIP method. This corresponds to the blocks of FIG. 10 and the diagonal (top-left) block.

Figure 12:
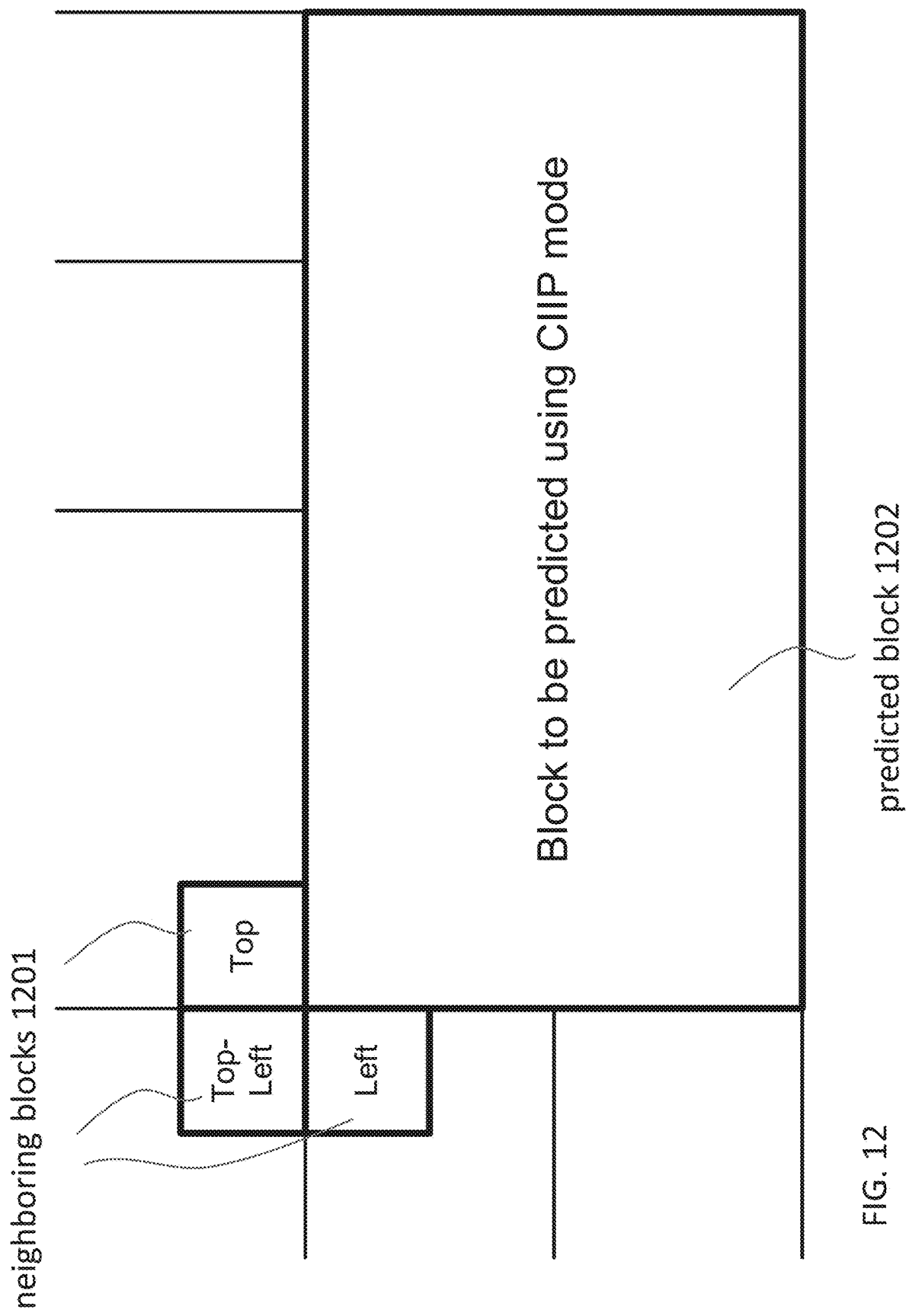
FIG. 12 is a schematic drawing showing an example of spatial positions of the neighboring blocks used in weight determination relative to the block being predicted.

Another example is illustrated o FIG. 12, wherein a left, a top-left and a top block 1201 are used for determination of the weights for CIIP of the current block 1202.

That is, according to an embodiment, one or more neighboring blocks may be used as basis for determination of the weights applied in a CIIP method for prediction of the values of a current block.

In some embodiments, the method for combined inter-intra prediction of a current block in video encoding or decoding comprises determining prediction information for a neighboring block adjacent to a current block, wherein the prediction information indicates a prediction mode, used for prediction of the neighboring block, out of prediction modes including a combined inter-intra-prediction mode. Further, the method comprises determining a prediction of the current block as a weighted sum of intra- and inter-predicted blocks, wherein the weights of the inter- and intra-predicted blocks are determined based on the prediction information of the neighboring block.

In other words, the current block is to be predicted utilizing a CIIP method, wherein the values of the current block are determined as a weighted sum of two predicted blocks. One of said two predicted blocks has been predicted applying an inter-prediction mode, whereas the other of said two predicted blocks has been predicted applying an intra-prediction mode.

Further, the weights for said weighted sum of inter- and intra-predicted blocks are based on the prediction information of a neighboring block. That is, information on the prediction mode applied for prediction of the neighboring block is used for determining the weights for the weighted sum of CIIP for the current block.

In particular, the prediction information for a neighboring block includes information on whether the neighboring block has been predicted applying a CIIP method.

In other words, the weights of the weighted sum of inter- and intra-predicted blocks for predicting the current block are determined taking into account whether a neighboring block has been predicted utilizing a CIIP mode.

It is a particular advantage of taking into account whether a neighboring block has been predicted utilizing a CIIP method that the weights of inter- and intra-predicted blocks used for prediction of a current block are determined such that a more accurate prediction of the current block is achieved.

Further, in an embodiment, the prediction mode indicated by the prediction information for a neighboring block may indicate whether the neighboring block has been predicted applying an inter-prediction mode or an inter-prediction mode. That is, the prediction information for a neighboring block may indicate whether an inter-prediction mode, an intra-prediction mode or a CIIP has been applied for predicting the neighboring blocks.

In an embodiment, the weights of the inter- and intra-predicted blocks differ for cases of the prediction mode of the neighboring block being an intra-prediction mode, a combined inter-intra prediction mode and an intra-prediction mode.

For example, the higher amount of intra-predicted neighbor blocks, the higher the weight for weighting the intra-predicted block in the CIIP. It is noted that if a neighboring block is a CIIP block, then it also includes an intra-coded part. Thus, with higher amount of CIIP blocks, the weight of the intra block in the CIIP may grow, too. In an example, the weight grows faster for intra blocks than for CIIP (and inter) blocks. It is noted that if the neighboring blocks may have different sizes, then the weight may be determined (calculated or derived) not based on the number of the intra and/or CIIP blocks but rather based on the proportion of the intra and/or CIIP blocks on the boundary of the current CU. In general, the neighbor blocks for determining the weight may but do not need to correspond to the neighbor CUs. So, a neighbor block is defined as having adjacent samples with a given block.

In other words, the weights for CIIP of the current block may be determined based on whether one neighbor block has been predicted applying an inter-, CIIP or intra-prediction mode. For instance, the weights (wIntra, wInter) may be set to (3,1) in a case where the neighbor block has been predicted applying an intra-prediction mode; further, the weights (wIntra, wInter) may be set to (2, 2) in a case where the neighbor block has been predicted applying a CIIP mode; still further, the weights (wIntra, wInter) may be set to (1, 3) in a case where the neighbor block has been predicted applying an inter-prediction mode.

Although in the example, the weights (wIntra, wInter) are set as one of (3, 1), (2, 2) and (1, 3), the present disclosure is not limited to this, and the weights (wIntra, wInter) may be determined as any other weights, for instance (0, 2), (1, 1) and (2, 0) for the neighbor block having been predicted applying an intra-, CIIP or inter-prediction mode, respectively.

In a case where more than one neighboring blocks are used for determining the weights to be applied in CIIP of the current block, prediction information for each of the neighboring blocks may be used for determining the weights.

That is, the prediction information for each block indicates whether the corresponding block has been predicted using inter-prediction, intra-prediction or CIIP.

The weights of the weighted sum for CIIP of the current block may be determined based on the prediction modes for the neighboring blocks indicated by the prediction information for the neighboring blocks.

Figure 13:
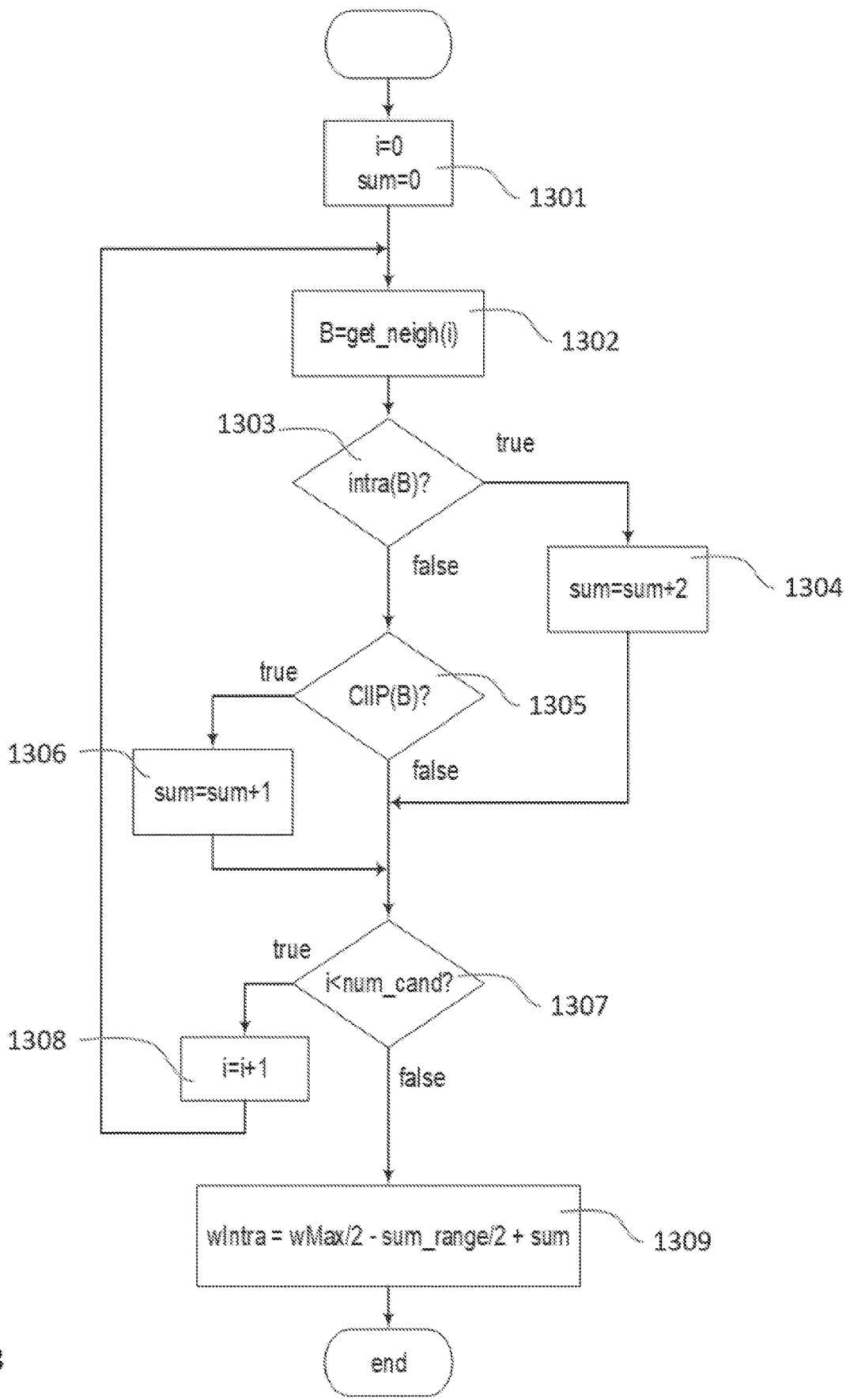
FIG. 13 is a flowchart of the method to determine weights using prediction modes of the neighboring blocks.

FIG. 13 is a flowchart illustrating the steps of a method according to an embodiment for determining the weights to be used for CIIP of the current block. According to the method illustrated in FIG. 13, an estimation value is determined. The estimation value is indicated as "sum". Further, the method comprises a loop over all num_cand neighbor blocks. As mentioned above, in order to determine the weight, all neighbor blocks at the top and/or left boundary may be used. In such case, num_cand corresponds to the number of all neighbor blocks available (e.g., already processed, i.e., encoded at the encoder sider and decoded at the decoder side). However, in order to reduce complexity, num_cand may be one or more of the neighbor blocks (which are known to both encoder and decoder, may be predefined by a standard or configurable in the bitstream of the coded video). In the above discussed FIGS. 8 to 12, the respective num_cand is 2, 3, 4, 5, and 3. The neighbor blocks considered here may have the same size.

In these examples, it is assumed that blocks at the top left boundary of the current CU are available at the encoder and the decoder, which corresponds to processing of the blocks from left to right and from top to bottom. However, the present disclosure is not limited to this processing (encoding, decoding) order. If the order is from right to left and bottom to top, then the right and bottom boundary neighbor blocks would be available.

The neighbor blocks are blocks being adjacent to current block. As indicated above, one or more neighbor blocks may be used for determining the weights. In particular, not all adjacent blocks have to be used as neighbor blocks in determining the weights. The neighbor blocks used for weight determination are indicated with a neighbor block index "i".

In step 1301, both the neighbor block index i and the estimation value sum are initiated by setting said values to zero.

In the next step, step 1302, the (prediction mode of a) neighbor block with index i is retrieved as a neighbor block labelled "B" from among the num_cand blocks. Said neighbor block B is subsequently used to determine an increment of the estimation value sum. The neighbor block does not practically need to be retrieved. FIG. 13 is schematic. In an implementation, the prediction information may be retrieved (obtained) and tested directly.

In particular, in step 1303, it is determines whether neighbor block B has been predicted applying an intra-prediction mode, according to the prediction information corresponding to neighbor block B. If it is determined that the neighbor block B has been predicted using an intra-prediction mode (true in step 1303), the estimation value sum is increased by 2 in step 1304 and it is proceeded to step 1307. If it is determined that the neighbor block B has not been predicted using an intra-prediction method (false in step 1303), it is proceeded to step 1305.

In step 1305, it is determined whether neighbor block B has been predicted applying a CIIP mode, according to prediction information corresponding to neighbor block B. If it is determined that the neighbor block B has been predicted using a CIIP mode (true in step 1305), the estimation value sum is increased by 1 in step 1306 and it is proceeded to step 1307. If it is determined that the neighbor block B has not been predicted using CIIP mode (false in step 1305), it is proceeded to step 1307.

In step 1307, it is determined whether the neighbor block index i is below the total number of neighbor blocks to be used for determining the weights for CIIP of the current block. The total number of neighbor blocks is indicated by num_cand in FIG. 13. If the neighbor block index i is below num_cand (true in step 1307), i is increased by one in step 1308 and it is proceeded to step 1302. That is, the steps 1302 to 1307 are performed for all neighboring blocks, which are used for determination of the weights for CIIP of the current block. If it is determined that the neighbor block index i is not below num_cand (that is, equal to or above num_cand), it is proceeded to step 1309.

In step 1309 the weight of the intra-coded block used in CIIP of the current block (indicated as wIntra) is determined as proportional to the estimation value sum. In particular, wIntra is set to a normalized value proportional to sum. Specifically, wIntra is set according to:

$$w\text{Intra}=w\text{Max}/2-\text{sum\_range}/2+\text{sum}$$

sum_range is a value equal to the maximum increment of sum multiplied by the number of neighbor blocks. In the example illustrated in FIG. 13, the maximal possible increment of sum is two. That is, in the example, sum_range is equal to 2 times the number of neighbor blocks. In particular, sum_range indicates the maximum theoretically possible value of sum.

wMax is a weight normalization value used for further normalization of the weighted sum to the range of input values. wMax defines the accuracy of calculations in fixed-point format and is selected in such a way that $$(w\text{Inter}+w\text{Intra})/w\text{Max}=1.$$

Thus, the larger a selected value of wMax is, the higher the accuracy of calculations is for a final CIIP predictor. Its value is typically a power of two and greater than sum_range.

The weight of the inter-coded block used in CIIP of the current block (indicated as wInter) is determined as a complement of the weight of the intra-predicted block. Specifically, wInter may be set to:

$$w\text{Inter}=w\text{Max}-w\text{Intra}.$$

Although in the embodiment illustrated in FIG. 13, the weight wIntra is set as direct proportional to sum, the disclosure is not limited to this. The weight wIntra may be set according to any dependency where wIntra increases as the estimation value sum increases. Accordingly, wInter is set as a complement to wIntra. That is, when the estimation value sum increases, wInter decreases.

Further, although in FIG. 13 the increment values is two in a case where the prediction mode of a neighbor block is an intra-prediction mode and the increment value is 1 in a case where the prediction mode of a neighbor block is a CIIP mode, the present disclosure is not limited to this. In particular, an increment value different from two may be associated with an intra-prediction mode and an increment value different from one may be associated with a CIIP mode.

Further, in the method illustrated in FIG. 13, the estimation value is not increased in a case where the prediction mode of a neighbor block is an inter-prediction mode. That is, the increment value associated with an inter-prediction mode is implicitly set to zero in the method illustrated in FIG. 13. However, the present disclosure is not limited to this. In particular, an increment value may be associated with in inter-prediction mode also. In this case, the estimation value is increased by said increment value in a case where the prediction mode of a neighbor block is an inter-prediction mode.

Further, the increment values associated with inter-, CIIP and intra-prediction mode may be different from each other. Preferably, the increment value associated with a CIIP mode is in between the increment values associated with inter- and intra-prediction modes. That is, the increment values may be different from each other.

Figure 14:
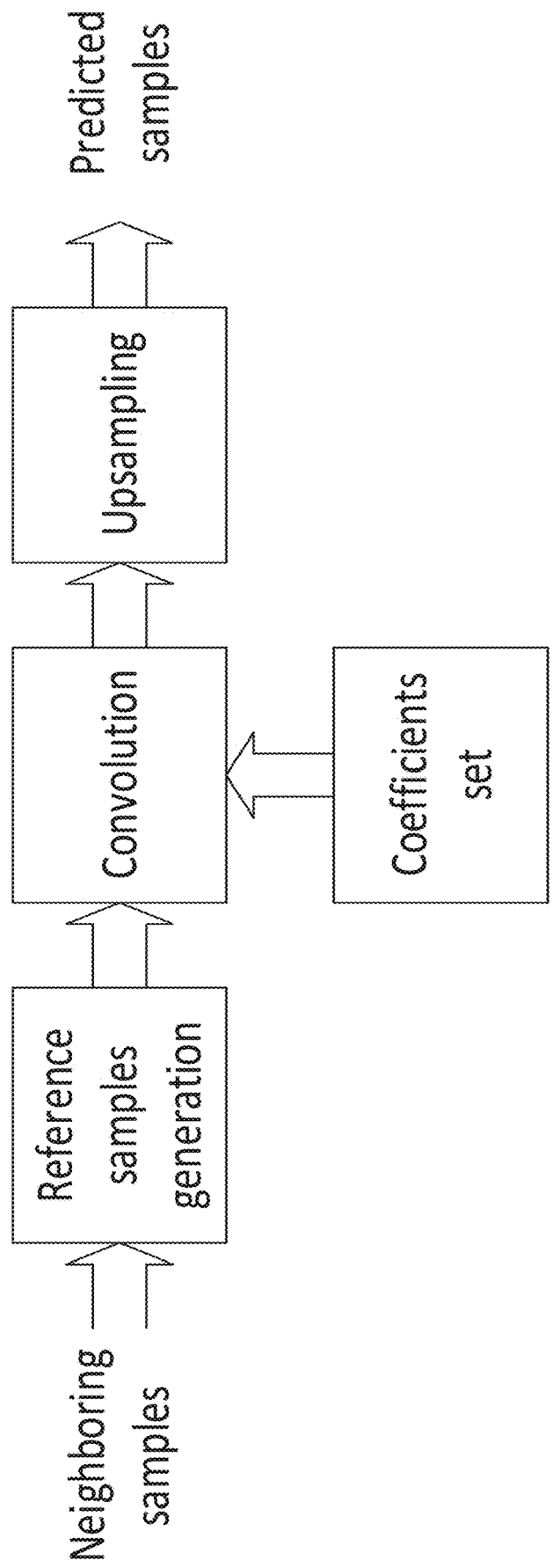
FIG. 14 is a flowchart of the method of MIP prediction.
Figure 15:
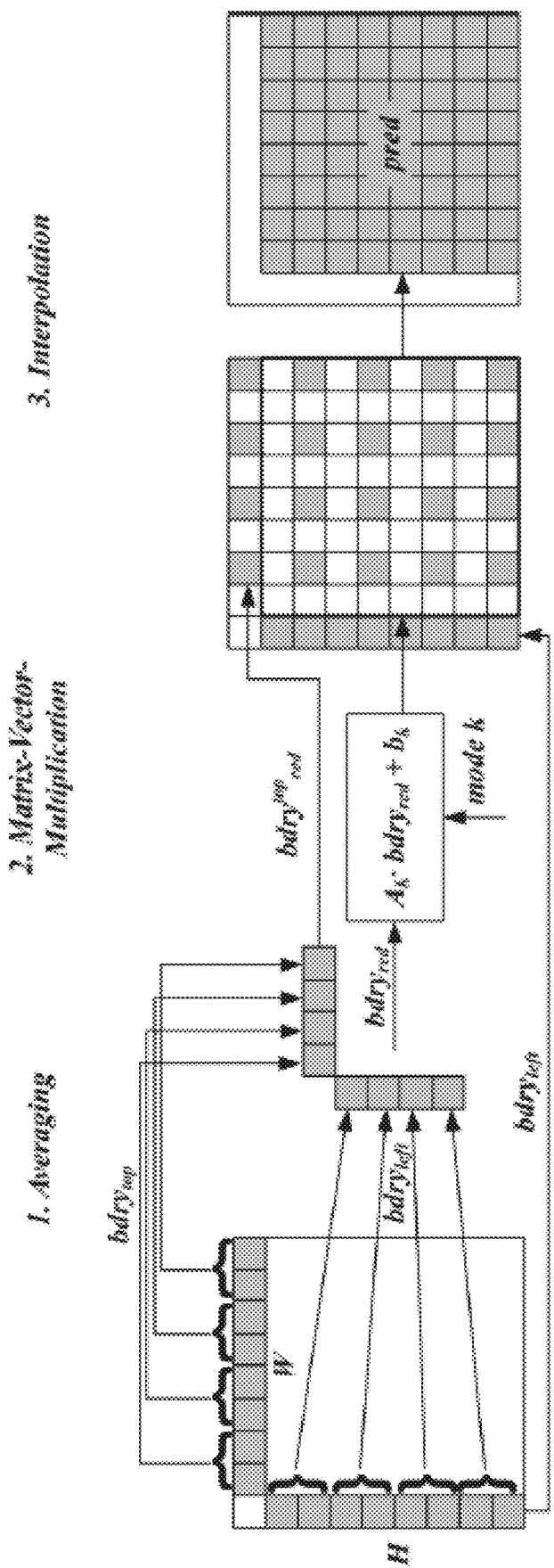
FIG. 15 is a schematic drawing showing an example of MIP prediction.

As shown in FIG. 14 and FIG. 15, matrix-based intra prediction (MIP) also known as Affine Linear Weighted Intra Prediction (ALWIP) uses reference samples to derive values of predicted samples. For predicting the samples of a rectangular block of width W and height H, MIP takes one line of H reconstructed neighbouring boundary samples left of the block and one line of W reconstructed neighbouring boundary samples above the block as input. If the reconstructed samples are unavailable, they are generated as it is done in the conventional intra prediction.

The generation of the prediction signal is based on the following three steps:
1. Out of the boundary samples, four samples in the case of W=H=4 and eight samples in all other cases are extracted by averaging.
2. A matrix vector multiplication, followed by addition of an offset, is carried out with the averaged samples as an input. The result is a reduced prediction signal on a subsampled set of samples in the original block.
3. The prediction signal at the remaining positions is generated from the prediction signal on the subsampled set by linear interpolation which is a single step linear interpolation in each direction.

The matrices and offset vectors needed to generate the prediction signal are taken from three sets $S_0$, $S_1$, $S_2$ of matrices. The set $S_0$ consists of 18 matrices $A_0^i$, $i \in \{0, \ldots, 17\}$ each of which has 16 rows and 4 columns and 18 offset vectors $b_0^i$, $i \in \{0, \ldots, 17\}$ each of size 16. Matrices and offset vectors of that set are used for blocks of size 4×4. The set $S_1$ consists of 10 matrices $A_1^i$, $i \in \{0, \ldots, 9\}$, each of which has 16 rows and 8 columns and 10 offset vectors $b_1^i$, $i \in \{0, \ldots, 9\}$ each of size 16. Matrices and offset vectors of that set are used for blocks of sizes 4×8, 8×4 and 8×8. Finally, the set $S_2$ consists of 6 matrices $A_2^i$, $i \in \{0, \ldots, 5\}$, each of which has 64 rows and 8 columns and of 6 offset vectors $b_2^i$, $i \in \{0, \ldots, 5\}$ of size 64. Matrices and offset vectors of that set or parts of these matrices and offset vectors are used for all other block-shapes.

The total number of multiplications needed in the computation of the matrix vector product is always smaller than or equal to 4·W·H. In other words, at most four multiplications per sample are required for the ALWIP modes.

Averaging of the Boundary

In a first step, the input boundaries $bdry^{top}$ and $bdry^{left}$ are reduced to smaller boundaries $bdry_{red}^{top}$ and $bdry_{red}^{left}$.

Here, $bdry_{red}^{top}$ and $bdry_{red}^{left}$ both consists of 2 samples in the case of a 4×4-block and both consist of 4 samples in all other cases.

In the case of a 4×4-block, for 0≤i<2, one defines $$bdry_{red}^{top}[i] = \left(\left(\sum_{j=0}^{1} bdry^{top}[i \cdot 2 + j]\right) + 1\right) \gg 1$$

and defines $bdry_{red}^{left}$ analogously.

Otherwise, if the block-width W is given as $W=4\cdot 2^k$, for 0≤i<4, one defines $$bdry_{red}^{top}[i] = \left(\left(\sum_{j=0}^{2^k-1} bdry^{top}[i \cdot 2^k + j]\right) + (1 \ll (k-1))\right) \gg k$$

and defines $bdry_{red}^{left}$ analogously.

The two reduced boundaries $bdry_{red}^{left}$ and $bdry_{red}^{left}$ are concatenated to a reduced boundary vector $bdry_{red}$ which is thus of size four for blocks of shape 4×4 and of size eight for blocks of all other shapes. If mode refers to the ALWIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdru_{red}^{top}] & \text{for } \max(W, H) > 8 \text{ and mode} \geq 6 \end{cases}$$

Finally, for the interpolation of the subsampled prediction signal, on large blocks a second version of the averaged boundary is needed. Namely, if min(W,H)>8 and W≥H, one writes $W=8*2^l$, and, for 0≤i<8, defines $$bdry_{redII}^{top}[i] = \left(\left(\sum_{j=0}^{2^l-1} bdry^{top}[i \cdot 2^l + j]\right) + (1 \ll (l-1))\right) \gg l.$$

If min(W,H)>8 and H>W, one defines $bdry_{redII}^{left}$ analogously.

Generation of the reduced prediction signal by matrix vector multiplication Out of the reduced input vector $bdry_{red}$ one generates a reduced prediction signal $pred_{red}$. The latter signal is a signal on the downsampled block of width $W_{red}$ and height $H_{red}$. Here, $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

The reduced prediction signal $pred_{red}$ is computed by calculating a matrix vector product and adding an offset:

$pred_{red} = A \cdot bdry_{red} + b$.

Here, A is a matrix that has $W_{red} \cdot H_{red}$ rows and 4 columns if W=H=4 and 8 columns in all other cases. b is a vector of size $W_{red} \cdot H_{red}$.

The matrix A and the vector b are taken from one of the sets $S_0$, $S_1$, $S_2$ as follows. One defines an index (further referred to as block size type) idx=idx(W,H) as follows:

$$idx(W, H) = \begin{cases} 0 & \text{for } W = H = 4 \\ 1 & \text{for } \max(W, H) = 8 \\ 2 & \text{for } \max(W, H) > 8. \end{cases}$$

Moreover, one puts m as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for } \max(W, H) = 8 \text{ and mode} < 10 \\ \text{mode} - 9 & \text{for } \max(W, H) = 8 \text{ and mode} \geq 10 \\ \text{mode} & \text{for } \max(W, H) > 8 \text{ and mode} < 6 \\ \text{mode} - 5 & \text{for } \max(W, H) > 8 \text{ and mode} \geq 6 \end{cases}$$

Then, if idx≤1 or idx=2 and min(W,H)>4, one puts $A = A_{idx}^m$ and $b = b_{idx}^m$. In the case that idx=2 and min(W,H)=4, one lets A be the matrix that arises by leaving out every row of $A_{idx}^m$ that, in the case W=4, corresponds to an odd x-coordinate in the downsampled block, or, in the case H=4, corresponds to an odd y-coordinate in the downsampled block.

Finally, the reduced prediction signal is replaced by its transpose in the following cases:

W=H=4 and mode≥18
max(W,H)=8 and mode≥10
max(W,H)>8 and mode≥6

Signaling of an intra prediction mode in presence of MIP could be formulated as it is shown in Table 1.

TABLE 1

Signaling of intra prediction modes if MIP is enabled.

```
...
if( treeType == SINGLE_TREE | | treeType ==
DUAL_TREE_LUMA ) {
    if( Abs( Log2( cbWidth ) - Log2( cbHeight ) ) <= 2 )
        intra_lwip_flag[ x0 ][ y0 ]                          ae(v)
    if( intra_lwip_flag[ x0 ][ y0 ] ) {
        intra_lwip_mpm_flag[ x0 ][ y0 ]                      ae(v)
        if( intra_lwip_mpm_flag[ x0 ][ y0 ] )
            intra_lwip_mpm_idx[ x0 ][ y0 ]                   ae(v)
        else
            intra_lwip_mpm_remainder[ x0 ][ y0 ]             ae(v)
    } else {
        if( ( y0 % CtbSizeY ) > 0 )
            intra_luma_ref_idx[ x0 ][ y0 ]                   ae(v)
```

TABLE 1-continued

Signaling of intra prediction modes if MIP is enabled.

```
    if (intra_luma_ref_idx[ x0 ][ y0 ] == 0 &&
      ( cbWidth <= MaxTbSizeY | | cbHeight <= MaxTbSizeY ) &&
      ( cbWidth * cbHeight > MinTbSizeY * MinTbSizeY ))
      intra_subpartitions_mode _flag[ x0 ][ y0 ]            ae(v)
    if( intra_subpartitions_mode_flag[ x0 ][ y0 ] == 1 &&
      cbWidth <= MaxTbSizeY && cbHeight <= MaxTbSizeY )
      intra_subpartitions_split_flag[ x0 ][ y0 ]            ae(v)
    if( intra_luma_ref_idx[ x0 ][ y0 ] == 0 &&
      intra_subpartitions_mode_flag[ x0 ][ y0 ] == 0 )
      intra_luma_mpm_flag[ x0 ][ y0 ]                       ae(v)
    if( intra_luma_mpm_flag[ x0 ][ y0 ] )
      intra_luma_mpm_idx[ x0 ][ y0 ]                        ae(v)
    else
      intra_luma_mpm_remainder[ x0 ][ y0 ]                  ae(v)
  }
...
```

The process of MPM list derivation requires intra prediction modes of the neighboring blocks. However, even if MIP is not used for the current block, neighboring blocks may be predicted using MIP and thus would have an intra prediction mode that is inconsistent with conventional non-MIP intra prediction modes. For this purpose a lookup table is introduced (Tables 2-4), that maps input MIP mode indexes to conventional intra prediction modes.

TABLE 2

A mode mapping lookup table for blocks 4 × 4

| MIP index | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| intraPredMode | 0 | 18 | 18 | 0 | 18 | 0 | 12 | 0 | 18 | 2 | 18 | 12 | 18 | 18 | 1 | 18 | 18 | 0 |
| MIP index | 18 | 19 | 20 | 21 | 22 | 23 | 24 | 25 | 26 | 27 | 28 | 29 | 30 | 31 | 32 | 33 | 34 | |
| intraPredMode | 0 | 50 | 0 | 50 | 0 | 56 | 0 | 50 | 66 | 50 | 56 | 50 | 50 | 1 | 50 | 50 | 50 | |

TABLE 3

A mode mapping lookup table for blocks 8 × 8

| MIP index | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| intraPredMode | 0 | 1 | 0 | 1 | 0 | 22 | 18 | 18 | 1 | 0 | 1 | 0 | 1 | 0 | 44 | 0 | 50 | 1 | 0 |

TABLE 4

A mode mapping lookup table for blocks 16 × 16

| MIP index | 0 | 1 | 2 | 3 | 4 | 5 | 6 | 7 | 8 | 9 | 10 |
|---|---|---|---|---|---|---|---|---|---|---|---|
| intraPredMode | 1 | 1 | 1 | 1 | 18 | 0 | 1 | 0 | 1 | 50 | 0 |

When a MIP block is predicted, its MPM list is being constructed with consideration of the neighboring non-MIP modes. These modes are mapped to the MIP ones using two steps:

At the first step, directional intra prediction mode is mapped to the reduced set of directional modes (see Table 5)

The second step is to determine MIP mode based on the determined directional mode of the reduced set of directional modes.

Alternatively, if a neighboring nonblack is not predicted using MIP, its mode is considered as MIP with index 0.

Alternatively, coding of an index of an intra prediction mode of an MIP block is done using truncated unary code, wherein the mapping of the codewords of the truncated unary code to the intra prediction mode indices do not depend on the neighboring blocks.

TABLE 5

Mapping of the directional intra prediction modes to the reduced set of directional modes

| intraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| intraPredMode33 | 0 | 1 | 2 | 2 | 3 | 3 | 4 | 4 | 5 | 5 | 6 | 6 | 7 | 7 | 8 | 8 | 9 | 9 |
| intraPredMode | 18 | 19 | 20 | 21 | 22 | 23 | 24 | 25 | 26 | 27 | 28 | 29 | 30 | 31 | 32 | 33 | 34 | 35 |
| intraPredMode33 | 10 | 10 | 11 | 11 | 12 | 12 | 13 | 13 | 14 | 14 | 15 | 15 | 16 | 16 | 17 | 17 | 18 | 18 |
| intraPredMode | 36 | 37 | 38 | 39 | 40 | 41 | 42 | 43 | 44 | 45 | 46 | 47 | 48 | 49 | 50 | 51 | 52 | 53 |
| intraPredMode33 | 19 | 19 | 20 | 20 | 21 | 21 | 22 | 22 | 23 | 23 | 24 | 24 | 25 | 25 | 26 | 26 | 27 | 27 |
| intraPredMode | 54 | 55 | 56 | 57 | 58 | 59 | 60 | 61 | 62 | 63 | 64 | 65 | 66 | | 67 | | | |
| intraPredMode33 | 28 | 28 | 29 | 29 | 30 | 30 | 31 | 31 | 32 | 32 | 33 | 33 | 34 | | DM-_CHROMA_IDX | | | |

Figure 16:
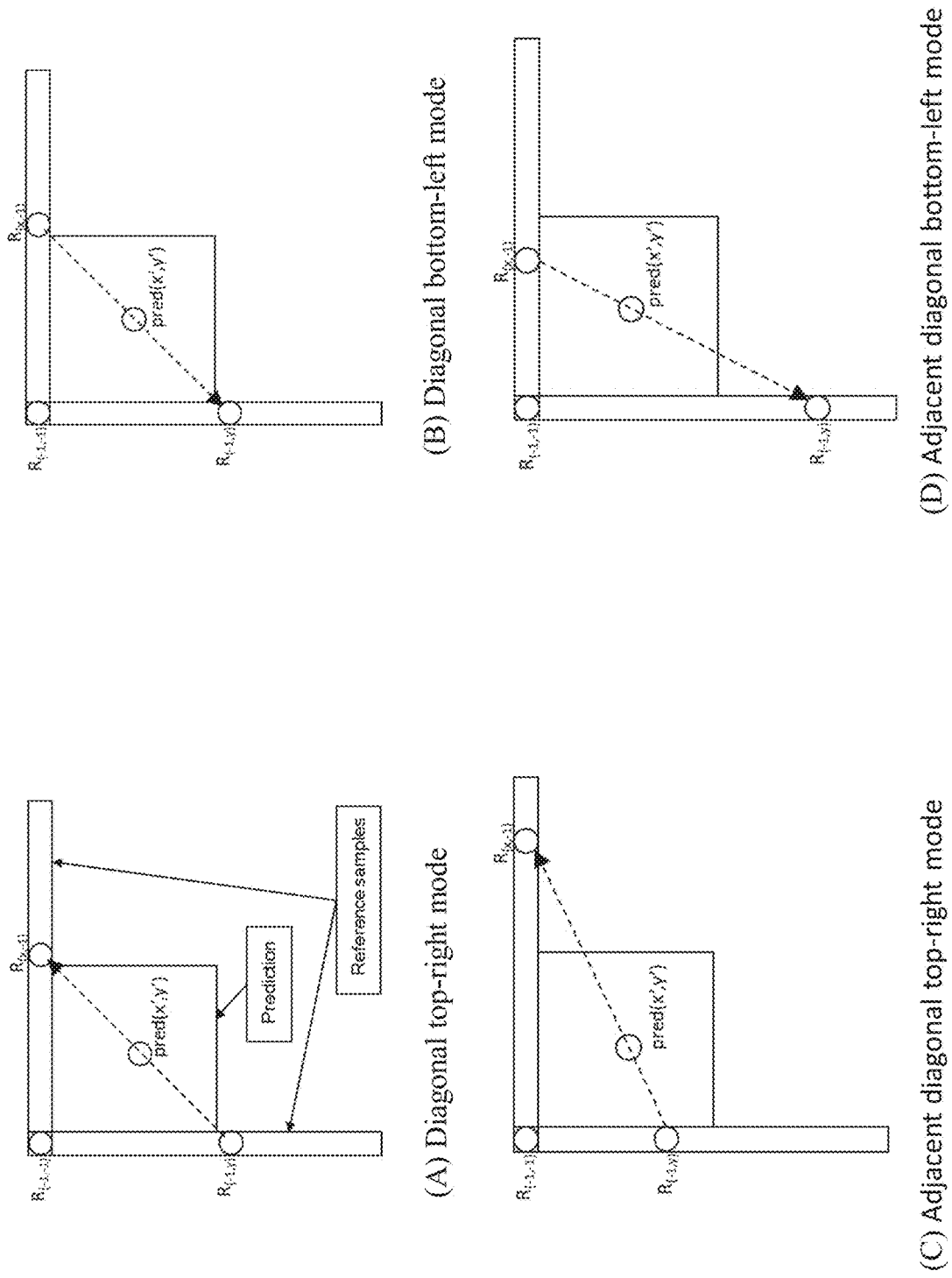
FIG. 16 is a schematic drawing showing a definition of samples used by PDPC extension to diagonal and adjacent angular intra modes.

Typically, for a conventional (i.e., DC, PLANAR or directional) intra prediction, predicted signal may be additionally updated by position dependent prediction combination (PDPC), as shown in FIG. 16 This process derives the increment value out of the set of reference samples and a weighting value that depend on the distance from the left or top boundary to a sample being updated. The larger values of the distance correspond to the smaller values of weights. According to PDPC, predicted sample is incremented by the increment value multiplied by the determined weight value.

In terms of the VVC specification draft, PDPC process is defined as follows: Inputs to this process are:
  the intra prediction mode predModeIntra,
  a variable nTbW specifying the transform block width,
  a variable nTbH specifying the transform block height,
  a variable refW specifying the reference samples width,
  a variable refH specifying the reference samples height,
  the predicted samples predSamples[x][y], with x=0 . . . nTbW−1, y=0 . . . nTbH−1,
  the neighbouring samples p[x][y], with x=−1, y=−1 . . . refH−1 and x=0 . . . refW−1, y=−1,
  a variable cIdx specifying the colour component of the current block.

Outputs of this process are the modified predicted samples predSamples[x][y] with x=0 . . . nTbW−1, y=0 . . . nTbH−1.

Depending on the value of cIdx, the function clip1Cmp is set as follows:
  If cIdx is equal to 0, clip1Cmp is set equal to $Clip1_Y$.
  Otherwise, clip1Cmp is set equal to $Clip1_C$.
The variable nScale is derived as follows:
  If predModeIntra is greater than INTRA_ANGULAR50, nScale is set equal to Min(2, Log 2(nTbH)−Floor(Log 2(3*invAngle−2))+8), using invAngle as specified in clause 8.4.5.2.12.
  Otherwise, if predModeIntra is less than INTRA_ANGULAR18, nScale is set equal to Min(2, Log 2(nTbW)−Floor(Log 2(3*invAngle−2))+8), using invAngle as specified in clause 8.4.5.2.12.
  Otherwise, nSacle is set to ((Log 2(nTbW)+Log 2(nTbH)−2)>>2).

The reference sample arrays mainRef[x] and sideRef[y], with x=0 . . . refW−1 and y=0 . . . refH−1 are derived as follows:

mainRef[x]=p[x][−1]

sideRef[y]=p[−1][y]

The variables refL[x][y], refT[x][y], wT[y], wL[x] and wTL[x][y] with x=0 . . . nTbW−1, y=0 . . . nTbH−1 are derived as follows:

If predModeIntra is equal to INTRA_PLANAR or INTRA_DC, the following applies:

refL[x][y]=p[−1][y]

refT[x][y]=p[x][−1]

wT[y]=32>>((y<<1)>>nScale)

wL[x]=32>>((x<<1)>>nScale)

wTL[x][y]=0

Otherwise, if predModeIntra is equal to INTRA_ANGULAR18 or INTRA_ANGULAR50, the following applies:

refL[x][y]=p[−1][y]

refT[x][y]=p[x][−1]

wT[y]=(predModeIntra==INTRA_ANGULAR18)?32>>((y<<1)>>nScale):0 wL[x]=(predModeIntra==INTRA_ANGULAR50)?32>>((x<<1)>>nScale):0 wTL[x][y]=(predModeIntra==INTRA_ANGULAR18)?wT[y]:wL[x]

Otherwise, if predModeIntra is less than INTRA_ANGULAR18 and nScale is equal to or greater than 0, the following ordered steps apply:
1. The variables dXInt[y] and dX[x][y] are derived as follows using invAngle as specified in clause 8.4.5.2.12 depending on intraPredMode:

dXInt[y]=((y+1)*invAngle+256)>>9 dX[x][y]=x+dXInt[y]

2. The variables refL[x][y], refT[x][y], wT[y], wL[x] and wTL[x][y] are derived as follows:

refL[x][y]=0 refT[x][y]=(y<(3<<nScale))?mainRef[dX[x][y]]:0 wT[y]=32>>((y<<1)>>nScale)

wL[x]=0 wTL[x][y]=0

Otherwise, if predModeIntra is greater than INTRA_ANGULAR50 and nScale is equal to or greater than 0, the following ordered steps apply:

1. The variables dYInt[x] and dY[x][y] are derived as follows using invAngle as specified in clause 8.4.5.2.12 depending on intraPredMode:

$$dYInt[x]=((x+1)*invAngle+256)>>9$$

$$dY[x][y]=y+dYInt[x]$$

2. The variables refL[x][y], refT[x][y], wT[y], wL[x] and wTL[x][y] are derived as follows:

$$refL[x][y]==(y<(3<<nScale))?sideRef[dY[x][y]]:0$$

$$refT[x][y]=0$$

$$wT[y]=0$$

$$wL[x]=32>>((x<<1)>>nScale)$$

$$wTL[x][y]=0$$

Otherwise, refL[x][y], refT[x][y], wT[y], wL[x] and wTL[x][y] are all set equal to 0.

The values of the modified predicted samples predSamples[x][y], with x=0 . . . nTbW−1, y=0 . . . nTbH−1 are derived as follows:

$$predSamples[x][y]=clip1Cmp((refL[x][y]*wL[x]+refT[x][y]*wT[y]-p[-1][-1]*wTL[x][y]+(64-wL[x]-wT[y]+wTL[x][y])*predSamples[x][y]+32)>>6)$$

An inter and intra prediction signals could be linearly combined together, as it is performed in weighted sample prediction process for combined merge and intra prediction. The process is described in the VVC specification draft as follows.

Inputs to this process are:
  a luma location (xCb, yCb) specifying the top-left sample of the current luma coding block relative to the top left luma sample of the current picture,
  the width of the current coding block cbWidth,
  the height of the current coding block cbHeight,
  two (cbWidth)×(cbHeight) arrays predSamplesInter and predSamplesIntra,
  a variable cIdx specifying the colour component index.

Output of this process is the (cbWidth)×(cbHeight) array predSamplesComb of prediction sample values.

The variable bitDepth is derived as follows:
If cIdx is equal to 0, bitDepth is set equal to $BitDepth_Y$.
Otherwise, bitDepth is set equal to $BitDepth_C$.
The variable scallFact is derived as follows:

$$scallFact=(cIdx==0)?0:1. \quad (8-838)$$

The neighbouring luma locations (xNbA, yNbA) and (xNbB, yNbB) are set equal to (xCb−1, yCb−1+(cbHeight<<scallFact)) and (xCb−1+(cbWidth<<scallFact), yCb−1), respectively.

For X being replaced by either A or B, the variables availableX and isIntraCodedNeighbourX are derived as follows:
  The derivation process for neighbouring block availability as specified in clause 6.4.4 is invoked with the location (xCurr, yCurr) set equal to (xCb, yCb), the neighbouring location (xNbY, yNbY) set equal to (xNbX, yNbX), checkPredModeY set equal to TRUE, and cIdx set equal to 0 as inputs, and the output is assigned to availableX.
  The variable isIntraCodedNeighbourX is derived as follows:
    If availableX is equal to TRUE and CuPredMode[0][xNbX][yNbX] is equal to MODE_INTRA, isIntraCodedNeighbourX is set equal to TRUE.
    Otherwise, isIntraCodedNeighbourX is set equal to FALSE.

The weight w is derived as follows:
  If isIntraCodedNeighbourA and isIntraCodedNeighbourB are both equal to TRUE, w is set equal to 3.
  Otherwise, if isIntraCodedNeighbourA and isIntraCodedNeighbourB are both equal to to FALSE, w is set equal to 1.
  Otherwise, w is set equal to 2.

When cIdx is equal to 0 and slice_lmcs_enabled_flag is equal to 1, predSamplesInter[x][y] with x=0 . . . cbWidth−1 and y=0 . . . cbHeight−1 are modified as follows:

$$idxY=predSamplesInter[x][y]>>Log\ 2(OrgCW)$$

$$predSamplesInter[x][y]=Clip1_Y(LmcsPivot[idxY]+(ScaleCoeff[idxY]*(predSamplesInter[x][y]-InputPivot[idxY])+(1<<10))>>11) \quad (8-839)$$

The prediction samples predSamplesComb[x][y] with x=0 . . . cbWidth−1 and y=0 . . . cbHeight−1 are derived as follows:

$$predSamplesComb[x][y]=(w*predSamplesIntra[x][y]+(4-w)*predSamplesInter[x][y]+2)>>2 \quad (8-840)$$

The disclosure provides a method of inter prediction that combines intra prediction mode and an inter-prediction mode using linear combination of samples belonging to these intra- and inter prediction signals, wherein intra prediction signal may be obtained using MIP method.

The steps of the disclosure is as follows:

In step 1, a method to generate intra prediction signal is determined, the method comprises the check of whether a conventional (either directional, DC or PLANAR) or a MIP process should be invoked, as well as the parameters of the intra prediction process, the parameters comprise intra prediction mode index and intra prediction smoothing parameters. Intra prediction smoothing parameters may comprise the following ones:
  reference sample smoothing filter type (e.g., either a bypass filter or a [1,2,1]/4 FIR filter);
  interpolation filter type (Gaussian or Cubic filter);
  presence of a position-dependent prediction combination applied to the result of intra prediction.

Selection of the intra prediction mode to obtain intra prediction signal may depend on the one or a combination of the following:
  Neighboring block intra prediction mode;
  Neighboring block size;
  A check whether a neighbor block was predicted using MIP method.

Predicted signal for luminance and chrominance components of a predicted block may be obtained differently. In particular, chroma components of the intra predicted signal could be obtained by applying conventional PLANAR intra prediction, and the luminance component of the predicted block could be obtained using one of the MIP modes.

One of the embodiments of the disclosure provides obtaining luminance component of an intra predicted signal using MIP flags of the neighboring blocks. The steps are as follows. In step 1, a current block size is checked. In case, the MIP block size type is determined for a block being predicted. For example, block size type idx(W,H) could be defined according to the following condition check of width W and height H:

$$idx(W, H) = \begin{cases} 0 & \text{for } W = H = 4 \\ 1 & \text{for } \max(W, H) = 8 \\ 2 & \text{for } \max(W, H) > 8 \end{cases}$$

When a block size type is 0, luminance component of an intra prediction signal is obtained using conventional PLANAR intra prediction. Otherwise processing continues with step 2.

In step 2, positions of the neighboring blocks 801 relative to the block to be predicted 802 are determined, as shown in FIG. 8. For example, a block that is horizontally adjacent to the bottom-left corner of a block to be predicted (denoted as "Left") and a block vertically adjacent to the upper-right corner of a block to be predicted (denoted as "Top"). In this step, availability of block is being checked. In a part of the VVC specification draft given above, "Left" block corresponds to the "A" block and "Top" block corresponds to the "B" block. In this step, the variables isIntraCodedNeighbourA and isIntraCodedNeighbourB could be used since their values already consider required availability checks.

Step 3 and step 4 are performed for a variable isIntraCodedNeighbourX, with "X" being substituted by either "A" or "B", w.r.t the block it relates to.

In step 3 variable isIntraCodedNeighbourX is set to false when one of the following conditions is false:
- prediction signal for block "X" was not obtained using MIP method;
- size type of block X is less than a threshold (for example, $idx(W_X, H_X) < 1$).

In step 4 an input MIP mode is determined as follows.
- When both variables isIntraCodedNeighbourA and isIntraCodedNeighbourB are set to false, the intra predicted signal is obtained using conventional intra prediction mode.
- When either isIntraCodedNeighbourA or and isIntraCodedNeighbourB is set to true, input MIP intra prediction mode is set to the mode of a block for which isIntraCodedNeighbourX is set to true.
- When both variables isIntraCodedNeighbourA and isIntraCodedNeighbourB are set to true, two input modes are defined: modeA is the MIP mode used to obtain predicted signal for block A and modeB is the MIP mode used to obtain predicted signal for block B.

In step 5 an input MIP modes determined in step 4 are mapped to the mapped modes. The mapping process is performed when size type of a block "X" is different from the size type of the block to be predicted, otherwise mapped mode is set equal to the input mode.

Table 6 shows the mapping of modes for type size 1 into modes for type size 2 and Table 7 shows the mapping of modes for type size 2 into modes for type size 1 and

TABLE 7

Mapping of modes for block size type 2 onto modes of block size type 1

| Block "X" MIP mode, idx = 2 | 0 | 1 | 2 | 3 | 4 | 5 | 6 | 7 | 8 | 9 | 10 |
|---|---|---|---|---|---|---|---|---|---|---|---|
| Predicted block MIP mode, idx = 1 | 0 | 3 | 18 | 1 | 7 | 8 | 12 | 9 | 10 | 16 | 17 |

In step 7, When both variables isIntraCodedNeighbourA and isIntraCodedNeighbourB are set to true a check for block A and block B is performed. Depending on the result of the check, the resulting MIP mode is set equal either to modeA or modeB.

In a particular embodiments, the check for block A and block B could be defined as a one or a combination of the following checks in order to select the output MIP mode:
- If a block A comprises less number of samples, than block B, mode A is selected. Otherwise, mode B is selected.
- If a height of block A is longer than the width of block B, mode A is selected. Otherwise, mode B is selected.
- If a height of a block to be predicted is shorter than the width of a block to be predicted, mode A is selected. Otherwise, mode B is selected.

An optional step 8 may comprise determination of whether PDPC process for the obtained intra predicted signal is performed. For example, When a MIP mode is selected, PDPC is not applied, otherwise, PDPC is applied.

In an other embodiment PDPC is applied to the result of the combination of intra and inter predicted signal.

In an other embodiment PDPC is applied to the result of the inter predicted signal, and intra predicted signal is not generated.

In another embodiment of the disclosure, a signaling mechanism is used in order to define the mode that is used to obtain an intra predicted signal, comprising the determination of whether MIP process should be invoked. The process consists of two steps.

In step 1, candidate list of prediction modes is constructed based on the intra prediction modes of neighboring blocks. Each entry of the list contain the value of intra prediction mode and a flag indicating whether this mode was obtained using MIP method.

In step 2, an entry index is being signalled in the bitstream, so that t intra prediction mode and the value of MIP flag could be determined using a single index value. Codewords for signaling the candidate mode index value could be specified using truncated binary coding. For example, when both variables isIntraCodedNeighbourA and isIntraCodedNeighbourB are set to true, candidate list could be constructed as shown in Table 8. When one of the variables isIntraCodedNeighbourA or isIntraCodedNeighbourB is set to true, candidate list could be constructed as shown in Table 9 or as it is shown in Table 10. When both isIntraCodedNeighbourA and isIntraCodedNeighbourB are set to false,

TABLE 6

Mapping of modes for block size type 1 onto modes of block size type 2

| Block "X" MIP mode, idx = 1 | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Predicted block MIP mode, idx = 2 | 1 | 3 | 9 | 1 | 0 | 0 | 0 | 4 | 5 | 7 | 8 | 4 | 6 | 0 | 0 | 0 | 9 | 10 | 2 | signaling mechanism is not involved and intra predicted signal is obtained using conventional PLANAR intra prediction mode.

TABLE 8

Codewords for signaling the candidate mode index value when isIntraCodedNeighbourA and isIntraCodedNeighbourB are set to true

| Codeword | Candidate mode index0 | Output Mode |
|---|---|---|
| 0 | 0 | PLANAR |
| 10 | 1 | ModeA |
| 11 | 2 | ModeB |

TABLE 9

Codewords for signaling the candidate mode index value when isIntraCodedNeighbourA or isIntraCodedNeighbourB are set to true

| Codeword | Candidate mode index0 | Output Mode |
|---|---|---|
| 0 | 0 | PLANAR |
| 10 | 1 | ModeA/modeB |
| 11 | 2 | MIP mode 0 |

TABLE 10

Codewords for signaling the candidate mode index value when isIntraCodedNeighbourA or isIntraCodedNeighbourB are set to true

| Codeword | Candidate mode index0 | Output Mode |
|---|---|---|
| 0 | 0 | PLANAR |
| 1 | 1 | ModeA/modeB |

In another embodiment, an intra predicted signal is obtained using MIP method when the length of a horizontal or vertical component of one of the motion vectors used to obtain inter predicted block to be predicted exceeds the predetermined threshold.

In another embodiment an intra predicted signal is obtained using MIP method when the deltaPOC value exceeds the predetermined threshold. deltaPOC is the absolute value of a difference between a picture order counter value of the picture to which a predicted block belongs to and a picture order counter value that was used to obtain inter-predicted signal for the block to be predicted.

Figure 17:
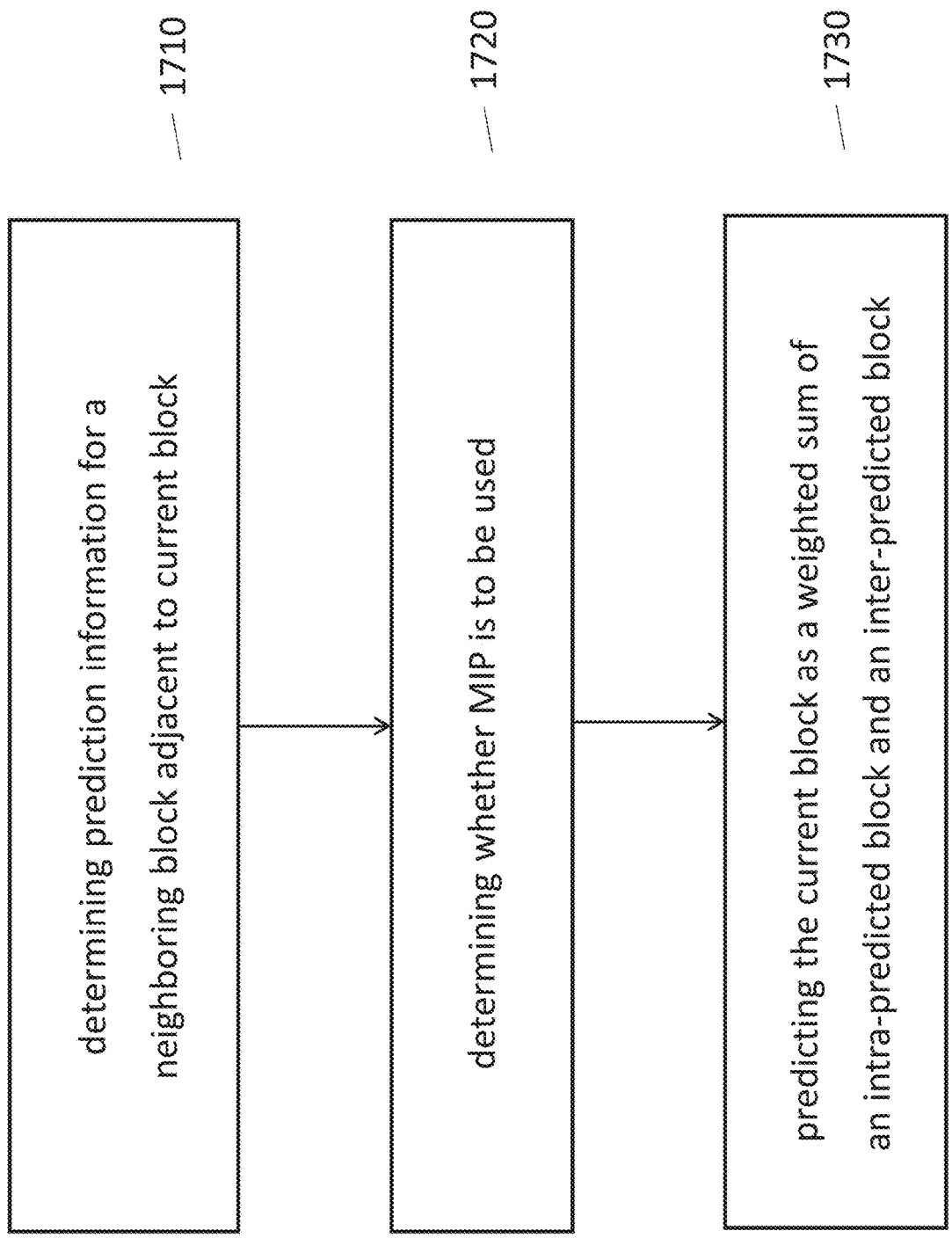
FIG. 17 shows a flow chart illustrating a method for combined inter-intra prediction of a current block in video coding.

In particular, herein it is provided a method for combined inter-intra prediction of a current block in video coding wherein combined intra-inter-prediction is used for providing a prediction block and wherein the weights for the intra- and inter-prediction blocks used to obtain the prediction block can be finely tuned, as it is illustrated in FIG. 17. This method comprises the following steps. Prediction information for a neighboring block adjacent to said current block is determined 1710, wherein the prediction information comprises a prediction mode used for prediction of the neighboring block. It is determined 1720 whether matrix-based intra prediction, MIP, is to be used for the prediction of the current block.

The current block is predicted 1730 as a weighted sum of an intra-predicted block and an inter-predicted block (thus, the block is predicted by CIIP), wherein weights of the inter-predicted block and the intra-predicted block are determined based on the prediction information for the neighboring block and the determining whether MIP is to be used for the prediction of the current block. The weights (in particular, the weight for the intra-prediction block relative to the inter-prediction block and/or the weight for the inter-prediction block relative to the intra-prediction block) can, thus, be fine-tuned according to both the properties of the neighboring block and the condition whether or not MIP, is to be used for the prediction of the current block in order to accurately predict the current block.

Figure 18:
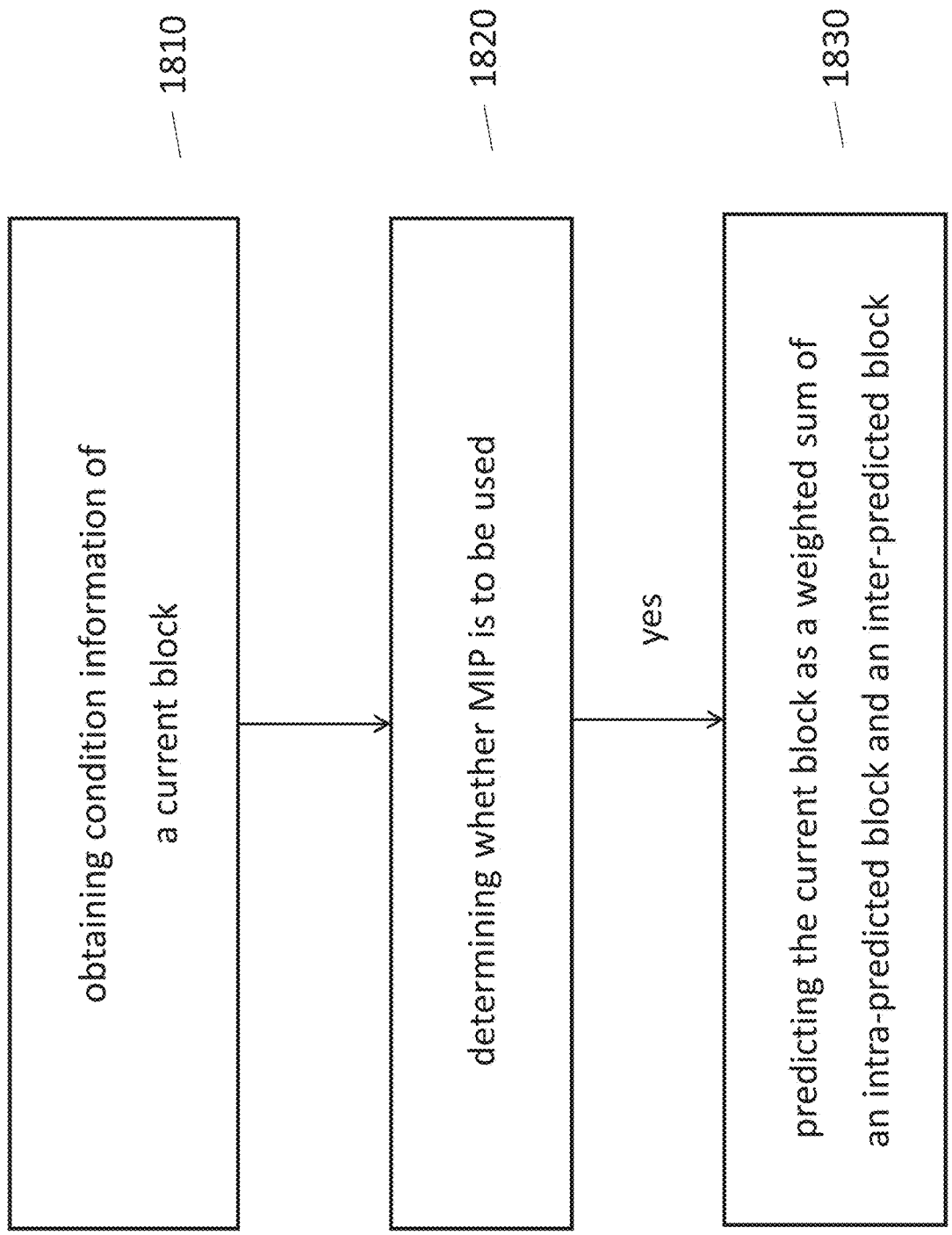
FIG. 18 shows a flow chart illustrating another method for combined inter-intra prediction of a current block in video coding.

FIG. 18 illustrates another embodiment of a method for combined inter-intra prediction of a current block in video coding. According to this method condition information of the current block is obtained 1810 and based on the obtained condition information it is determined 1820 whether matrix-based intra prediction, MIP, is to be used for the prediction of the current block. When it is determined that the MIP is to be used for the prediction of the current block, a prediction of the current block is determined by CIIP, i.e., as a weighted sum of an intra-predicted block and an inter-predicted block.

According to the method illustrated in FIG. 18, CIIP for the current block is (only) performed when it is determined that the MIP is to be used for the prediction of the current block, i.e., the intra-predicted block used for obtaining the predicted block for the current block. Thus, a particular combination of CIIP and MIP is provided that might be advantageous with respect to the resulting accuracy of the predictor.

The methods illustrated in FIGS. 17 and 18 can be readily implemented in the source device 12 and the destination device 14 shown in FIG. 1A or the video encoder 20 shown in FIGS. 1B and 2 and the video decoder 30 shown in FIGS. 1B and 2, respectively. Further, methods illustrated in FIGS. 17 and 18 can be readily implemented in the video coding device 400 shown in FIG. 4 as well as in the apparatus 500 shown in FIG. 5.

Figure 19:
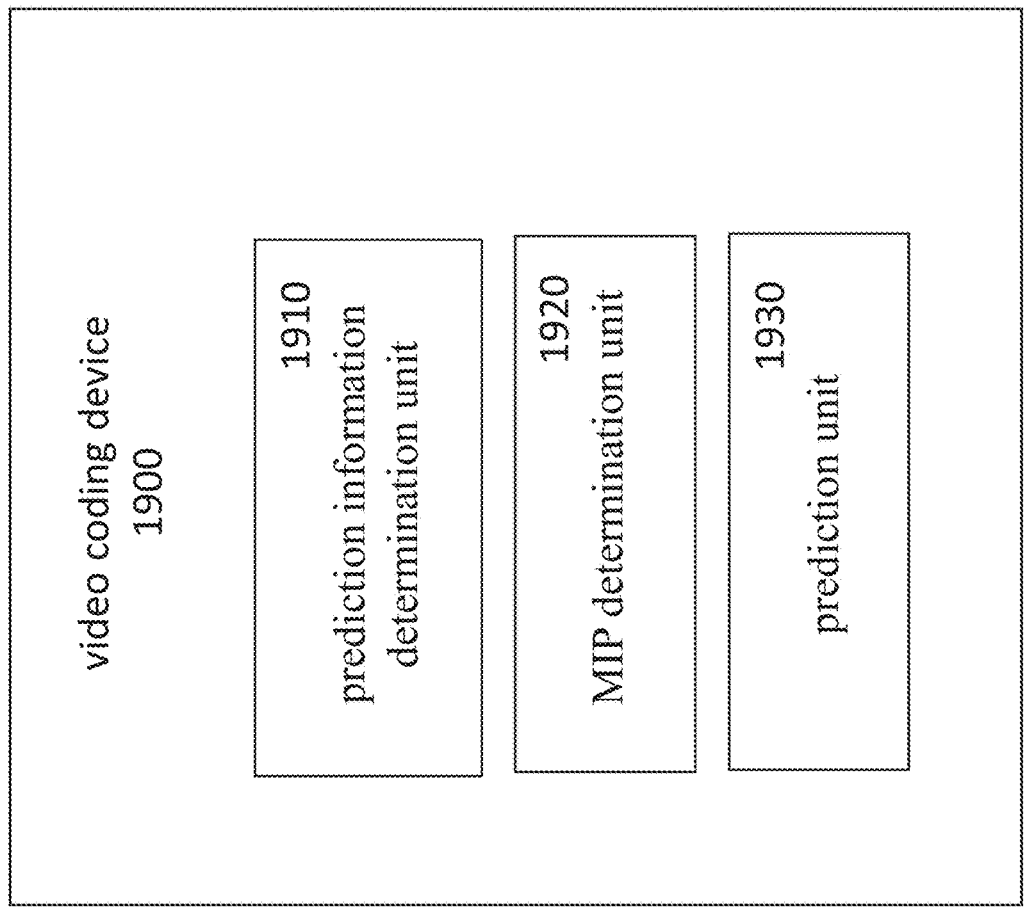
FIG. 19 illustrates a configuration of a video coding device.
Figure 20:
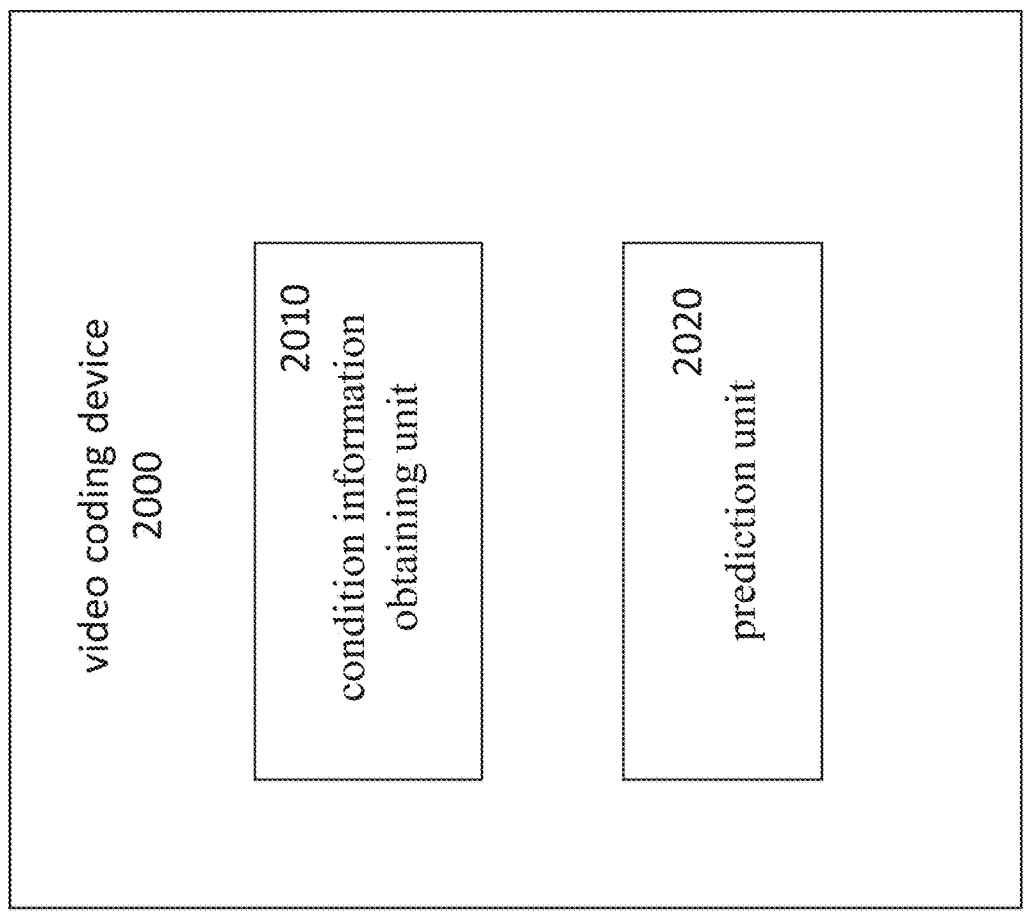
FIG. 20 illustrates another configuration of a video coding device.

Furthermore, video coding devices 1900 and 2000, respectively, as illustrated in FIGS. 19 and 20 are provided. The methods illustrated in FIGS. 17 and 18 can be readily implemented in the video coding devices as illustrated in FIGS. 19 and 20 and theses devices may be configured to perform the steps of these methods.

In particular, the video coding device 1900 shown in FIG. 19 comprises a prediction information determination unit 1910 configured to determine prediction information for a neighboring block adjacent to a current block. The prediction information comprises a prediction mode used for prediction of the neighboring block. Further, the video coding device 1900 comprises a matrix-based intra prediction, MIP, determination unit 1920 that is configured to determine whether MIP is to be used for the prediction of the current block. Further, the video coding device 1900 comprises a prediction unit configured to predict the current block as a weighted sum of an intra-predicted block and an inter-predicted block and determining weights of the inter-predicted block and the intra-predicted block based on the prediction information for the neighboring block and the determining whether MIP is to be used for the prediction of the current block.

In particular, the video coding device 2000 shown in FIG. 20 comprises a condition information obtaining unit 2010 configured to obtain condition information of a current block to determine whether matrix-based intra prediction, MIP, is to be used for the prediction of the current block. Further, the video coding device 2000 comprises a prediction unit 2020 configured to determine a prediction of the current block as a weighted sum of an intra-predicted block and an inter-predicted block when it is determined that the MIP is to be used for the prediction of the current block.

Moreover, the following embodiments are provided herein.

1. A method for combined inter-intra prediction of a current block in video encoding or decoding, comprising:

determining prediction information for a neighboring block adjacent to said current block, the prediction information comprises determination of whether an MIP method should be used to obtain an intra-predicted signal and a prediction mode, used for prediction of the neighboring block; and determining a prediction of the current block as a weighted sum of an intra-predicted block and an inter-predicted block, wherein the weights of the inter-predicted block and the intra-predicted block are determined based on the prediction information for the neighboring block.

2. The method according to embodiment 1, wherein
the prediction modes indicated by the prediction information of the neighboring block further include an inter-prediction mode and an intra-prediction mode.

3. The method according to embodiment 1 or 2, wherein the determining the prediction information comprises determining that the prediction mode used for prediction of the neighboring block is a combined inter-intra-prediction mode.

4. The method according to any of the previous enumerated embodiments, wherein the determination of whether an MIP method should be used to obtain an intra-predicted signal is performed by checking conditions for the neighboring blocks 5. The method according to any of the previous enumerated embodiments, wherein the MIP intra prediction mode is obtained by a mapping process if a neighboring block and a block to be predicted have different size type indices 6. The method according to any of the previous enumerated embodiments, wherein the MIP intra prediction mode is obtained by indication of the index within a list of candidate modes.

7. The method of embodiment 6, wherein truncated unary code is used to signal the index of an intra prediction information within a list of candidate modes 8. The method according to any of the previous enumerated embodiments, wherein the determination of whether MIP method is applied to obtain intra prediction signal is performed by checking the length of components of motion vectors that are used to obtain inter prediction signal for a block to be predicted.

9. The method according to any of the previous enumerated embodiments, wherein the determination of whether MIP method is applied to obtain intra prediction signal is performed by checking deltaPOC value.

10. A method for combined inter-intra prediction of a current block in video encoding or decoding, comprising:

obtaining condition information of the current block to determine whether MIP method is used for the current block; and determining a prediction value of the current block as a weighted sum of an intra-predicted block and an inter-predicted block in the event that the MIP method is used for the current block.

11. The method according to embodiment 10, wherein
the condition information includes an inter-prediction mode and/or an intra-prediction mode of a neighboring block adjacent to the current block.

12. The method according to embodiment 10 or 11, wherein in the event that the condition information indicates the neighboring block is a combined inter-intra-prediction mode, the MIP method is used for the current block.

13. The method according to any of the embodiments 10-12, wherein a MIP intra prediction mode is obtained by a mapping process when the neighboring block and the current block have different sizes.

14. The method according to any of embodiments 10-13, wherein the MIP prediction mode is obtained by an indicator for represent an index of a list of candidate modes.

15. The method of embodiment 14, wherein truncated unary code is used to signal the indicator.

16. The method according to any of the embodiments 10-15, wherein the condition information is obtained by checking a length of components of motion vectors that are used to obtain inter prediction signal for the current block.

17. The method according to any of the embodiments 10-16, wherein the condition information is obtained by checking deltaPOC value.

Mathematical Operators

The mathematical operators used in this disclosure are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.
Modulus. Remainder of x divided by y, defined only for integers x and y with x>=0 x % y and y>0.

Logical Operators

The following logical operators are defined as follows:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Relational Operators

The following relational operators are defined as follows:

> Greater than

>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

— Decrement, i.e., x–– is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z  x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$A\tan2(y, x) = \begin{cases} A\tan\left(\frac{y}{x}\right); & x > 0 \\ A\tan\left(\frac{y}{x}\right) + \pi; & x < 0 \,\&\&\, y >= 0 \\ A\tan\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.

$\text{Clip1}_Y(x) = \text{Clip3}(0,(1<<\text{BitDepth}_Y)-1,x)$ $\text{Clip1}_C(x) = \text{Clip3}(0,(1<<\text{BitDepth}_C)-1,x)$ $$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

$\text{Round}(x) = \text{Sign}(x)^*\text{Floor}(\text{Abs}(x) + 0.5)$ $$\text{Sign}(x) = \begin{cases} 1; & x > 0 \\ 0; & x == 0 \\ -1; & x < 0 \end{cases}$$

Sin(x) the trigonometric sine function operating on an argument x in units of radians $$\mathrm{Sqrt}(x) = \sqrt{x}$$

$$\mathrm{Swap}(x,y) = (y,x)$$

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
|---|
| operations (with operands x, y, and z) |
| "x++", "x− −" |
| "!x", "−x" (as a unary prefix operator) |
| $x^y$ |
| "x * y", "x/y", "x ÷ y", "x/y", "x % y" |
| "x + y", "x − y" (as a two-argument operator), |
| $"\sum_{i=x}^{y} f(i)"$ |
| "x << y", "x >> y" |
| "x < y", "x <= y", "x > y", "x >= y" |
| "x = = y", "x != y" |
| "x & y" |
| "x \| y" |
| "x && y" |
| "x \|\| y" |
| "x ? y : z" |
| "x . . . y" |
| "x = y", "x += y", "x −= y" |

Text Description of Logical Operations

In the text, a statement of logical operations as would be described mathematically in the following form:

```
if( condition 0 )
    statement 0
else if( condition 1 )
    statement 1
. . .
else /* informative remark on remaining condition */
    statement n
``` may be described in the following manner:
. . . as follows/ . . . the following applies:
If condition 0, statement 0
Otherwise, if condition 1, statement 1
. . .
Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a  &&  condition 0b )
    statement 0
else if( condition 1a  | |  condition 1b )
    statement 1
. . .
else
    statement n
``` may be described in the following manner:
. . . as follows/ . . . the following applies:
If all of the following conditions are true, statement 0:
    condition 0a
    condition 0b
Otherwise, if one or more of the following conditions are true, statement 1:
    condition 1a
    condition 1b
. . .
Otherwise, statement n In the text, a statement of logical operations as would be described mathematically in the following form:

```
if( condition 0 )
    statement 0
if( condition 1 )
    statement 1
``` may be described in the following manner:
When condition 0, statement 0
When condition 1, statement 1

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method for combined inter-intra prediction (CIIP) of a current block in video coding, the method comprising:
    determining prediction information for a neighboring block adjacent to the current block, the prediction information comprising a prediction mode used for prediction of the neighboring block;
    determining whether matrix-based intra prediction (MIP) is to be used for the prediction of the current block; and
    predicting the current block as a weighted sum of an intra-predicted block and an inter-predicted block, wherein weights of the inter-predicted block and the intra-predicted block are determined based on the prediction information for the neighboring block and the determining whether MIP is to be used for the prediction of the current block, wherein the determining of whether the MIP is to be used for the prediction of the current block comprises checking a difference, delta-POC value, between a picture order counter value of a picture to which the current block belongs and a picture order counter value of a picture to which a block belongs that was used to obtain the inter-predicted block, and determining that the MIP is to be used for the prediction of the current block in response to the absolute deltaPOC value exceeding a predetermined threshold.

2. The method according to claim 1, wherein the determining of the prediction information comprises determining that the prediction mode used for the prediction of the neighboring block is a combined inter-intra-prediction (CIIP) mode.

3. The method according to claim 1, further comprising:
    determining additional prediction information for n additional neighboring blocks adjacent to the current block, the additional prediction information comprising prediction modes used for prediction of the n additional neighboring block, n being an integer between 1 and the number of all neighboring blocks adjacent to the current block minus 1; and
    wherein the weights of the inter-predicted block and the intra-predicted block are determined further based on the additional prediction information.

4. The method according to claim 1, wherein the weights of the inter-predicted block and the intra-predicted block further depend on at least one of a number of inter-predicted neighboring blocks adjacent to the current block, a number of intra-predicted neighboring blocks adjacent to the current block, or a number of CIIP predicted neighboring blocks adjacent to the current block.

5. The method according to claim 1, wherein the determining of whether the MIP is to be used for the prediction of the current block comprises: checking conditions for the neighboring block, wherein the conditions for the neighboring block comprise at least one of: an intra-prediction mode of the neighboring block adjacent to the current block, the size of the neighboring block adjacent to the current block, and whether or not the neighboring block adjacent to the current block is predicted by the MIP.

6. The method according to claim 1, wherein an MIP intra prediction mode is obtained by a mapping process in response to the neighboring block adjacent to the current block and the current block to be predicted having different sizes.

7. The method according to claim 1, wherein an MIP intra prediction mode is obtained based on an index within a list of candidate modes.

8. The method according to claim 1, wherein the determining of whether the MIP is to be used for the prediction of the current block comprises checking lengths of vertical and horizontal components of motion vectors that are used to obtain the inter-predicted block, and determining that the MIP is to be used for the prediction of the current block in response to the lengths of the vertical and horizontal components of at least one of the motion vectors exceeding a predetermined threshold.

9. The method according to claim 1, wherein predicting the current block comprises performing position dependent prediction combination (PDPC) on a) the intra-predicted block, or b) the sum of the intra-block and the inter-predicted block, and
    wherein the PDPC is performed only in response to a determination that the MIP is not to be used for the prediction of the current block.

10. An encoder comprising processing circuitry, the processing circuitry being configured to carrying out the following method:
    determining prediction information for a neighboring block adjacent to a current block, the prediction information comprising a prediction mode used for prediction of the neighboring block;
determining whether matrix-based intra prediction, (MIP), is to be used for the prediction of the current block; and
predicting the current block as a weighted sum of an intra-predicted block and an inter-predicted block, wherein weights of the inter-predicted block and the intra-predicted block are determined based on the prediction information for the neighboring block and the determining whether MIP is to be used for the prediction of the current block, wherein the determining of whether the MIP is to be used for the prediction of the current block comprises checking a difference, deltaPOC value, between a picture order counter value of a picture to which the current block belongs and a picture order counter value of a picture to which a block belongs that was used to obtain the inter-predicted block, and determining that the MIP is to be used for the prediction of the current block in response to the absolute deltaPOC value exceeding a predetermined threshold.

11. The encoder according to claim 10, wherein the processing circuitry is further configured to:
determine that the prediction mode used for prediction of the neighboring block is a combined inter-intra-prediction (CIIP) mode.

12. The encoder according to claim 10,
wherein the processing circuitry is further configured to:
determine additional prediction information for n additional neighboring blocks adjacent to the current block, the additional prediction information comprising prediction modes used for prediction of the n additional neighboring block, n being an integer between 1 and the number of all neighboring blocks adjacent to the current block minus 1, and
wherein the weights of the inter-predicted block and the intra-predicted block are determined further based on the additional prediction information.

13. The encoder according to claim 10, wherein the weights of the inter-predicted block and the intra-predicted block further depend on at least one of a number of inter-predicted neighboring blocks adjacent to the current block, a number of intra-predicted neighboring blocks adjacent to the current block, or a number of CIIP predicted neighboring blocks adjacent to the current block.

14. The encoder according to claim 10, wherein in response to a determination that the MIP is not to be used for the prediction of the current block and the neighboring block adjacent to the current block is intra-predicted by an MIP mode, an intra prediction mode for obtaining the intra-predicted block is obtained by a mapping process.

15. A decoder comprising processing circuitry, the processing circuitry being configured to carrying out the following method:
determining prediction information for a neighboring block adjacent to a current block, the prediction information comprising a prediction mode used for prediction of the neighboring block;
determining whether matrix-based intra prediction (MIP) is to be used for the prediction of the current block; and
predicting the current block as a weighted sum of an intra-predicted block and an inter-predicted block, wherein weights of the inter-predicted block and the intra-predicted block are determined based on the prediction information for the neighboring block and the determining whether MIP is to be used for the prediction of the current block, wherein the determining of whether the MIP is to be used for the prediction of the current block comprises checking a difference, deltaPOC value, between a picture order counter value of a picture to which the current block belongs and a picture order counter value of a picture to which a block belongs that was used to obtain the inter-predicted block, and determining that the MIP is to be used for the prediction of the current block in response to the absolute deltaPOC value exceeding a predetermined threshold.

16. The decoder according to claim 15, wherein the processing circuitry is further configured to:
determine that the prediction mode used for prediction of the neighboring block is a combined inter-intra-prediction (CIIP) mode.

17. The decoder according to claim 15, wherein the processing circuitry is further configured to:
determine additional prediction information for n additional neighboring blocks adjacent to the current block, the additional prediction information comprising prediction modes used for prediction of the n additional neighboring block, n being an integer between 1 and the number of all neighboring blocks adjacent to the current block minus 1; and
wherein the weights of the inter-predicted block and the intra-predicted block are determined further based on the additional prediction information.

18. The decoder according to claim 15, wherein the weight of the inter-predicted block is determined complementarily to the determined weight of the intra-predicted block.

19. The decoder according to claim 15, wherein the weights of the inter-predicted block and the intra-predicted block further depend on at least one of a number of inter-predicted neighboring blocks adjacent to the current block, a number of intra-predicted neighboring blocks adjacent to the current block, or a number of CIIP predicted neighboring blocks adjacent to the current block.

* * * * *